United States Patent
Mead

(10) Patent No.: US 9,736,147 B1
(45) Date of Patent: Aug. 15, 2017

(54) ARTIFICIAL INTELLIGENCE ENCRYPTION MODEL (AIEM) WITH DEVICE AUTHORIZATION AND ATTACK DETECTION (DAAAD)

(71) Applicant: Craig Mead, Burlingame, CA (US)

(72) Inventor: Craig Mead, Burlingame, CA (US)

(73) Assignee: Titanium Crypt, Inc., Burlingame, CA (US)

( * ) Notice: Subject to any disclaimer, the term of this patent is extended or adjusted under 35 U.S.C. 154(b) by 354 days.

(21) Appl. No.: 14/247,514

(22) Filed: Apr. 8, 2014

Related U.S. Application Data

(60) Provisional application No. 61/853,551, filed on Apr. 8, 2013.

(51) Int. Cl.
*G06F 21/00* (2013.01)
*H04L 29/06* (2006.01)

(52) U.S. Cl.
CPC ........ *H04L 63/083* (2013.01); *H04L 63/0428* (2013.01); *H04L 63/0838* (2013.01); *H04L 63/1466* (2013.01)

(58) Field of Classification Search
CPC .............. H04L 63/083; H04L 63/0838; H04L 63/0428; H04L 63/1466
See application file for complete search history.

(56) References Cited

U.S. PATENT DOCUMENTS

| | | | | |
|---|---|---|---|---|
| 6,671,810 B1 * | 12/2003 | Jardin | ................ | H04L 63/0428 726/3 |
| 8,667,280 B2 * | 3/2014 | Sama | ..................... | G06F 21/31 713/168 |
| 8,744,075 B2 * | 6/2014 | Tanaka | .................. | H04L 9/0858 380/278 |
| 2002/0144128 A1 * | 10/2002 | Rahman | ............. | H04L 63/0861 713/186 |
| 2008/0098464 A1 * | 4/2008 | Mizrah | ................... | G06F 21/36 726/5 |
| 2008/0163334 A1 * | 7/2008 | Perich | .................. | H04W 8/245 726/1 |
| 2010/0235629 A1 * | 9/2010 | Tuda | .................... | G06Q 20/341 713/159 |

(Continued)

OTHER PUBLICATIONS

L. Wagoner, Thesis: "Detecting Man-In-The-Middle Attacks Against Transport Layer Security Connections with Timing Analysis" Air Force Institute of Technology Sep. 2011.

*Primary Examiner* — Jeffrey Pwu
*Assistant Examiner* — William Corum, Jr.
(74) *Attorney, Agent, or Firm* — Morgan, Lewis & Bockius LLP

(57) ABSTRACT

A user of a client device establishes a secure connection to a server (or other) device without using public keys or third-party certification by entering only a subset of characters in a username associated with the user and a one-time-use password at the client device; an application on the client device collects information regarding the hardware, software, or network information related to the client device or biometric information related to the user. Data sent between the client and server is encrypted (and thereafter transmitted) using the subset of characters, one-time-use password, and collected information. Communications between the client and server may be monitored to detect a man-in-the-middle attacker, and a security strength may be varied accordingly.

33 Claims, 9 Drawing Sheets

(56) References Cited

U.S. PATENT DOCUMENTS

| | | | |
|---|---|---|---|
| 2010/0287382 A1* | 11/2010 | Gyorffy | G06F 21/36 713/185 |
| 2011/0066607 A1* | 3/2011 | Wong | G06F 17/3053 707/706 |
| 2011/0179478 A1* | 7/2011 | Flick | H04L 9/0822 726/9 |
| 2011/0208964 A1* | 8/2011 | Sama | G06F 21/31 713/168 |
| 2013/0124292 A1* | 5/2013 | Juthani | G06F 21/41 705/14.26 |
| 2014/0033321 A1* | 1/2014 | Patidar | G06F 21/6218 726/27 |
| 2014/0282875 A1* | 9/2014 | Ignatchenko | H04W 12/06 726/3 |
| 2015/0172273 A1* | 6/2015 | Dong | H04L 63/083 726/7 |

* cited by examiner

Two Examples Of "One-Key" Convenience and Security since the entire ID is never collected

3rd Character of Your ID:

2nd Character of Your PW:

5th digit of "Carrot-Top's" Phone Number:

BELOW IS THE SAME PROMPT BROKEN UP REQUIRING USER MOUSE-CLICK PARTICIPATION
*Useful for collecting:*
- *Random Mouse Data, and;*
- *Patterns of User Reflex Speed and Dexterity, and;*
- *Mouse Speed for Current Hardware Setting Identification.*

3rd character of your Email ID:

2nd and 5th character of your Current One-Time-Use Password:

5th digit of "Carrot-Tops" Phone Number:

Fig. 6

ARTIFICIAL INTELLIGENCE ENCRYPTION MODEL (AIEM) WITH DEVICE AUTHORIZATION AND ATTACK DETECTION (DAAAD)

CROSS-REFERENCE TO RELATED APPLICATIONS

This application claims priority to and the benefit of U.S. Provisional Patent Application Ser. No. 61/853,551, filed on Apr. 8, 2013, which is hereby incorporated herein by reference in its entirety.

TECHNICAL FIELD

Embodiments of the present invention relate generally to computer security and, more particularly, to remote-login and encryption methods and systems.

BACKGROUND

Public/private key cryptography is in widespread use throughout the Internet and the World Wide Web and is relied on to prevent hackers, thieves, or other malicious individuals, parties, or governments from intercepting and decrypting personal, private, or otherwise sensitive information. Increasingly, however, these malicious parties are able to overcome and/or circumvent standard public/private key cryptography. At its core, this kind of cryptography relies on its complexity for its security; the system relies on the fact that malicious third parties will not have access to computers powerful enough to, for example, find primes of large numbers in real time (or in near-real time) and thereby crack the encryption with a brute-force attack. As computers become more powerful, however, and new types of computers (especially quantum computers) become more readily realizable, this assumption becomes less and less valid.

In addition to brute-force attacks, hackers have become adept at undermining, circumventing, or weakening standard public/private key cryptography such that a brute-force attack is not required or necessary. For example, malware surreptitiously installed on a client computer may log a user's keystrokes and a script injection attack can acquire credentials as a user is typing them in or modify the script completely so https or any other secure protocol is completely disabled, and thereafter credentials are transmitted via plaintext completely unknown to the user. Typically, once credentials are acquired by a third party intending to sign in, no brute-force attack on the user's encryption method is required. Similarly, a phishing attempt (via a web page, email, or malware application) may acquire the user's log-in name and password directly. Existing public/private key cryptography utilizes a trusted signing authority; a malicious third party may corrupt and/or stand in the place of this trusted signer and thereby weaken the strength of or eliminate the user's encryption (even if the user is presented with a warning that the signing authority is not recognized, the user may click through anyway). Finally, the public/private key encryption algorithms themselves may be attacked and weakened by a third party, the government or even the designer, for example, coercing a business or service to use weaker encryption algorithms and/or to generate weak random numbers (i.e., numbers that purport to be random but exhibit some pattern or history known to the malicious third party), and the best performing, most popular encryption algorithms today, Blowfish and AES, have a built-in key size limitation weakness, degrading their ability to stand the test of time and eventually rendering them useless as computing power continues to improve.

For any or all of these reasons, a need therefore exists for a system and method for securely and a) creating a key that is unbreakable by either a brute-force attack of one or more computers, or as computer CPU capacity improves, able to stand the test of time, and b) definitively establishing a connection between entities on a computer network, and c) detecting the presence of malware or an unauthorized participant to the transmissions, and d) transmitting sensitive information in an un-hackable format therebetween, and e) monitoring the session and client state by the server, so when an attack is detected an unaware, inattentive or negligent user cannot simply by-pass warning messages and log into a corrupt session, and f) allowing for key size and encryption strength to grow in size automatically to compensate for faster computers able of attack ciphers with brute force.

SUMMARY

In general, various aspects of the systems and methods described herein permit a user of a software or firmware application, browser, or other electronic mechanism (hereinafter "client" or "first party") to create various sets of digitized fingerprints (hereinafter "fingerprints"), which may be divided into static fingerprints that are generally the same each time a user accesses a server, dedicated system, firmware driven device, peer-to-peer client, or multi-peer network (hereinafter "second parties"), together forming a group of authorized parties, and dynamic fingerprints which may vary either slightly or widely from session to session, including device hardware and software performance and capabilities, user behavior, user bio-metric performance and physical characteristics (such as retina or facial scanning, hand, cardiac pulse, physical fingerprint(s) or other optional biological characteristics), CPU processes, loads and capacities and transmission characteristics shared among the authorized parties, page format, content, byte count and page load speeds, as well as an optional temporary key used for two-factor authentication (hereinafter "2FA") which may or may not rely on a secondary device, person or process.

Other embodiments of the present invention permit the authorized parties to strengthen their respective fingerprints based on transmission statistics including, but not limited to IP address, one-way and round-trip packet times and hashes derived from transmission content and clock offsets between the authorized parties and to use the fingerprints to form a set of semi-unique credentials further refined by the user's ID, password, challenge questions, images or other data known to the user, and optional 2FA. The credentials may be transmitted via the network to one or more authorized parties, which are then utilized to authenticate the client, and used by the client to authenticate any other authorized parties. A primitive level of encryption may be created during the initial authentication process sufficient to exclude revealing sensitive information in real-time, without exposing any sensitive information that could be obtained from an offline brute-force attack, where the transmitted data can only be created and later verified to be a valid client demonstrating "proof-of-work" by the client, without the user typing in their full username or full password.

A full level of encryption may thereafter be established, which may grow stronger as CPU speeds continue to improve, sufficient to prevent any attack either during the session or at a later date during the lifetime of the user, despite possibilities of advances in CPUs which might allow a brute force attack on a weaker algorithm, again without the user typing in their full username. A unique, random set of shared keys known only to the authenticated parties may thereafter be established, without transmitting the username, password or keys during the login process; and thereafter, the shared keys may be used to encrypt data which may be decrypted only by the authenticated parties, but cannot be decrypted by either an active man-in-the-middle attacker attempting to modify or control the session, or a passive man-in-the-middle attacker who simply records the session for an attempt to decrypt the data later. Nor can a user who lacks all the credentials or challenge questions required for verification establish a valid session with authorized parties with a username, one-time password, or any device, biometric or other credentials; nor can an attacker perform a replay attack to either decrypt the session data and thereupon log into or otherwise obtain data which would allow an attacker to compromise an account (hereinafter "sensitive data); nor can a man-in-the-middle attacker modify the user's scripts with an intent of tricking a user into providing credentials to be utilized by the attacker in the same or subsequent session.

These and other objects, along with advantages and features of the present invention herein disclosed, will become more apparent through reference to the following description, the accompanying drawings, data and script examples, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which:

FIG. 6 illustrates an exemplary log-in screen or interface in accordance with embodiments of the present invention;

DETAILED DESCRIPTION

Figure 1:
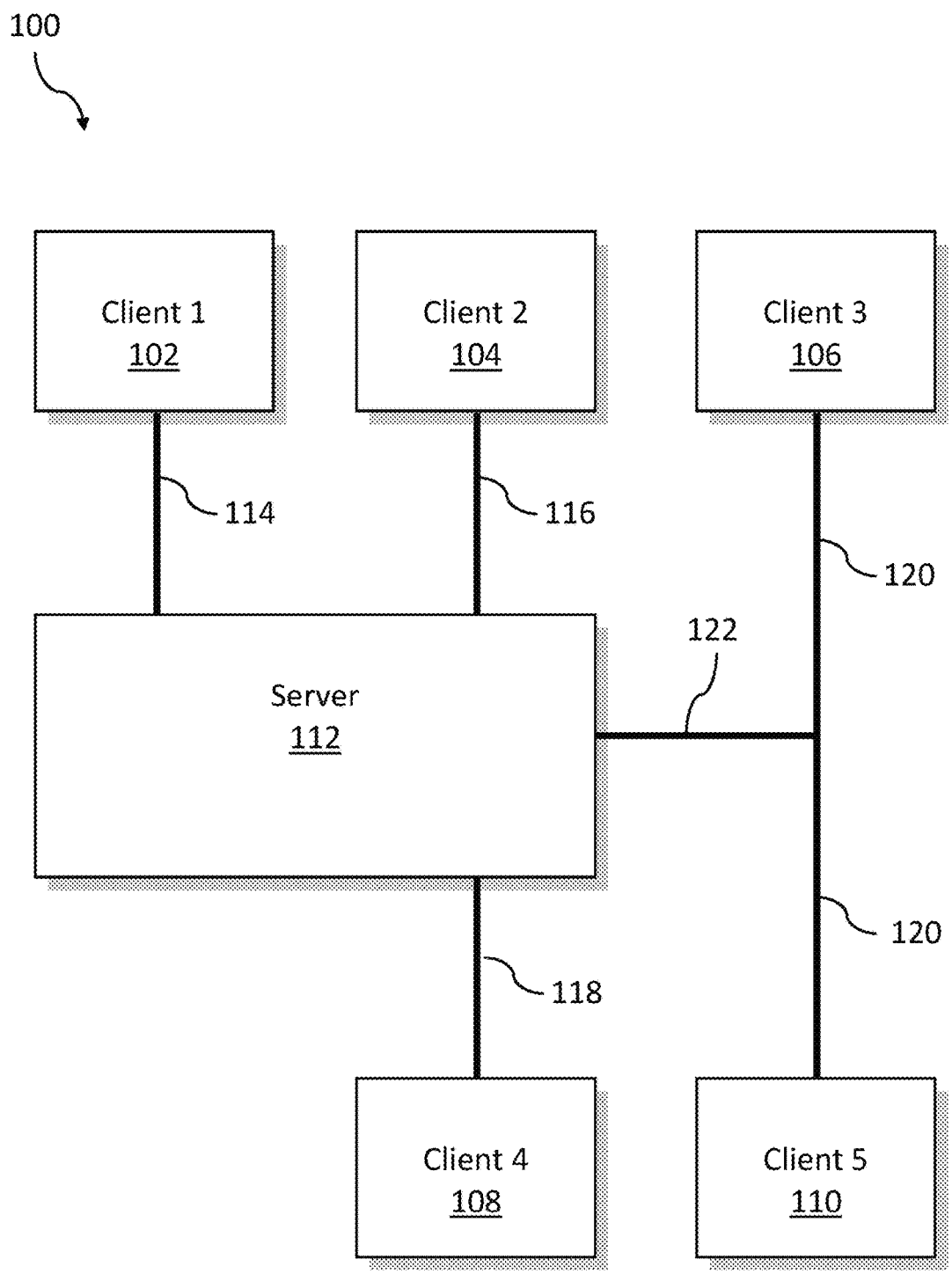
FIG. 1 illustrates a network environment containing exemplary network connections in accordance with embodiments of the present invention.

Described herein are various embodiments of methods and systems for improved computer security, authentication, and attack detection. FIG. 1 illustrates a network environment 100 that includes one or more clients 102-110 and a server 112. The clients may be personal computers, laptop computers, tablet PCs, smartphones, or any other type of end-user device, and may run MICROSOFT WINDOWS, APPLE OSX, GOOGLE ANDROID, GNU/LINUX, SYMBIAN, BLACKBERRY OS, or any other type of operating system, using executables and interpreted scripts of any common software language; including Assembly, C, C++, PERL, PHP, SQL, JAVA, JAVASCRIPT, COBOL. The clients 102-110 may communicate with the server 112 and/or each other via network links 114-122, which may be Internet links or any other wide-area or local network links, and may include ETHERNET, WI-FI, cellular networks (e.g., LTE or CDMA) or any other type of network. The clients 102-110 may allow a user to access said network via software applications, web browsers, or other software.

In one embodiment, a client 102 communicates with a server 112 via a network link 114. The server 112 may include or consist of an e-commerce web site, a banking web site, an application server, a software-as-a-service provider, a message board, or any other type of software application or server that handles or receives private information concerning the user and thus requires security or encryption for messages therebetween. In another embodiment, a client 104 communicates with a second client 108 via the server 112; said communications may include email or similar services. In still another embodiment, a client 106 communicates directly with another client 110 via network link 120; the server 112 may or may not monitor the connection 120 passively via a connection 122. As explained below, embodiments of the present invention allow users of one or more of the clients 102-110 to communicate with other clients 102-110 and/or one or more servers 112 without typing his or her full username, and without transmitting his or her username or password in any of these described (or similar) configurations (i.e., client-server, server-assisted client-to-client, or direct client-to-client communication).

Figure 2:
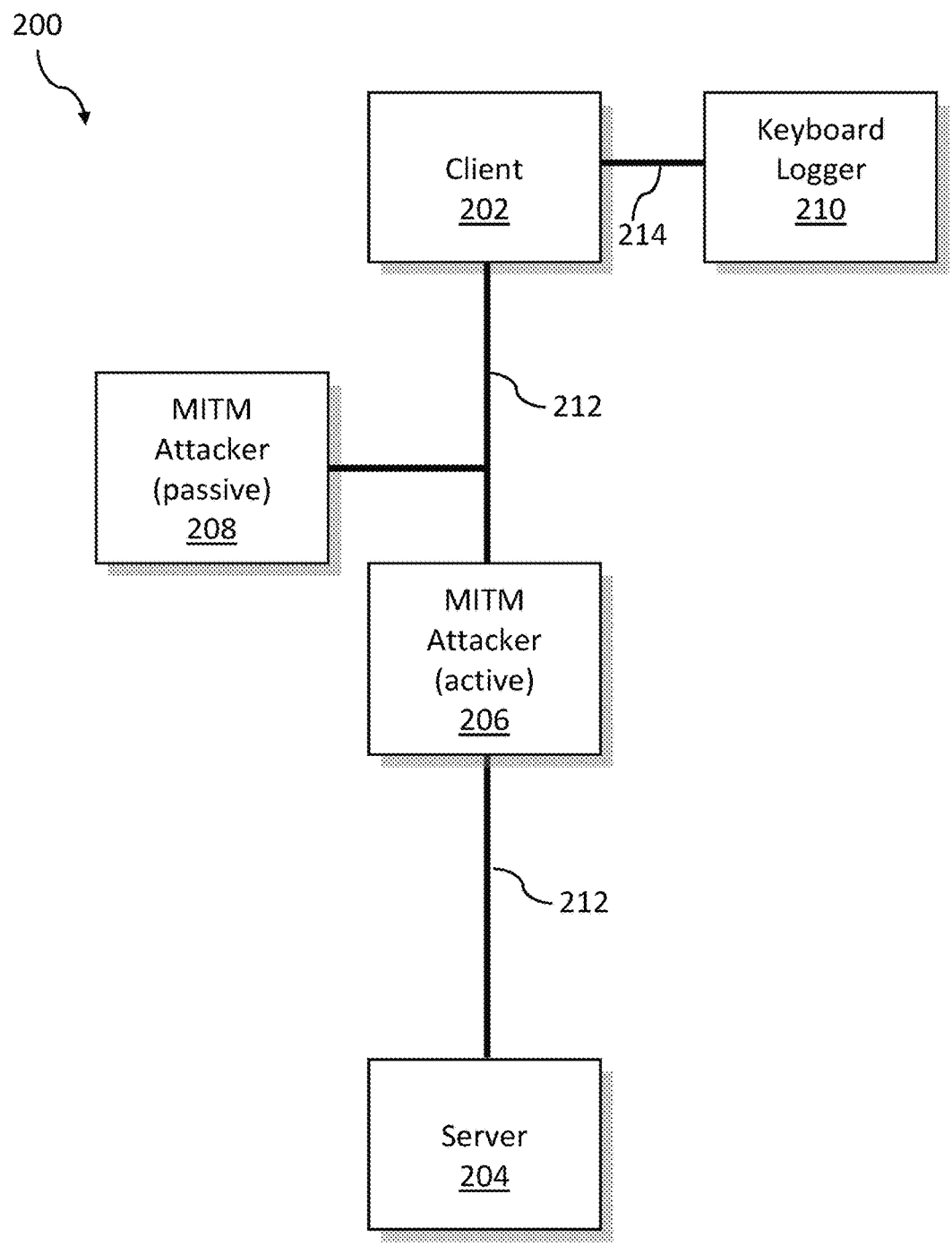
FIG. 2 illustrates a network environment containing exemplary malicious third-party attackers in accordance with embodiments of the present invention.

FIG. 2 illustrates a network environment 200 that includes malicious third-party attackers. A client 202 communicates with a server 204 via a network link 212. A passive man-in-the-middle attacker 208 may monitor the communications therebetween and attempt to decrypt said communications using, in some cases, information known about the user of the client 202 (such as a Diffie-Hellman calculation or an email-address-based or other type of username). An active man-in-the-middle attacker 206 inserts itself directly in the network link 212; the attacker 206 intercepts data sent from the client 202 and/or server 204 and attempts to respond to either or both as if it were the intended recipient of the data (a so-called "oracle" attacker). Finally, a keyboard logger 210 (or similar malware) may be installed on the client 202 and/or on a device in trusted communication with the client 202 (e.g., a home router or switch or device in communication therewith) and attempt to log the user's keystrokes and/or access username or password information stored on the client computer.

I. Device Authorization

Figure 3:
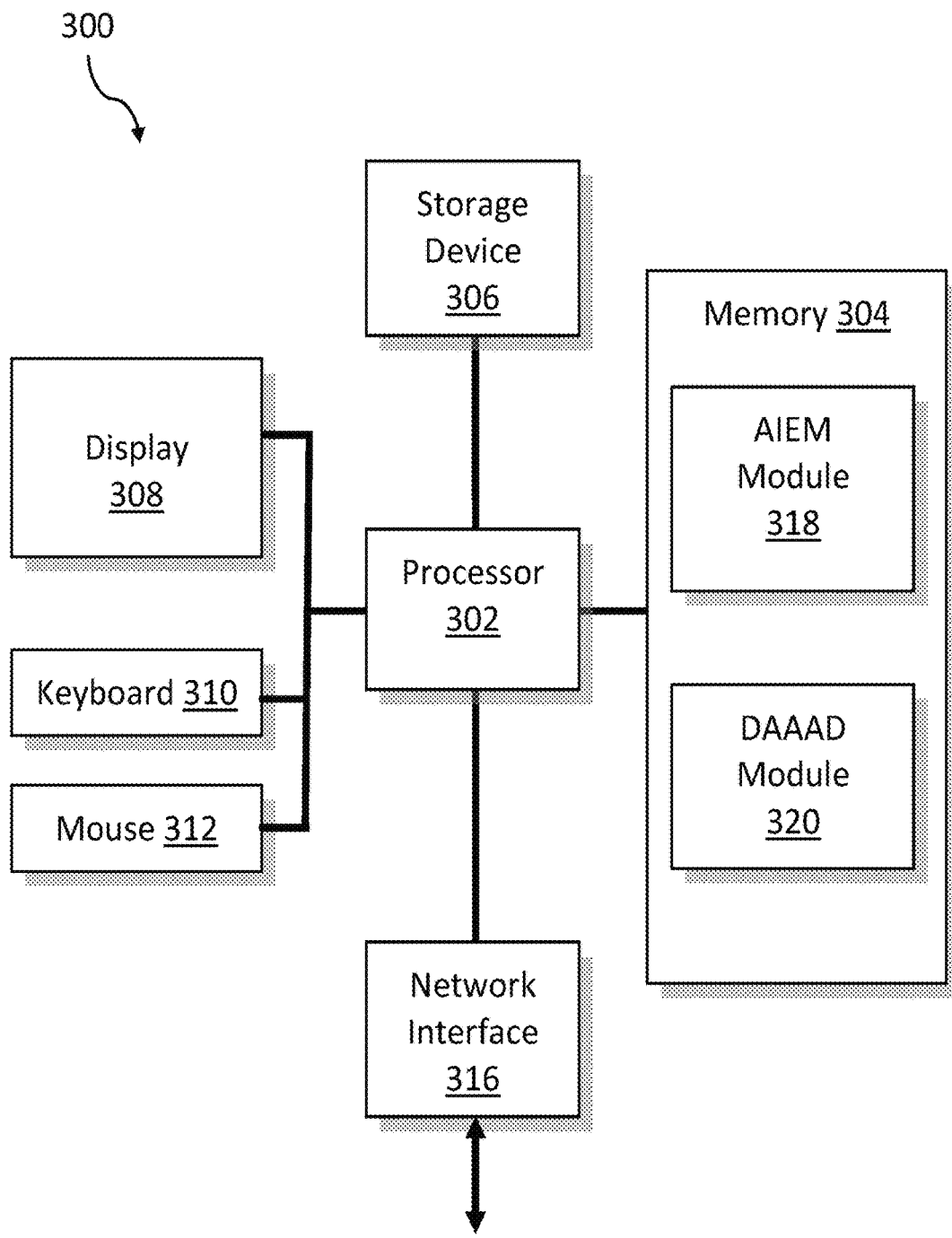
FIG. 3 illustrates an exemplary client system in accordance with embodiments of the present invention.
Figure 4:
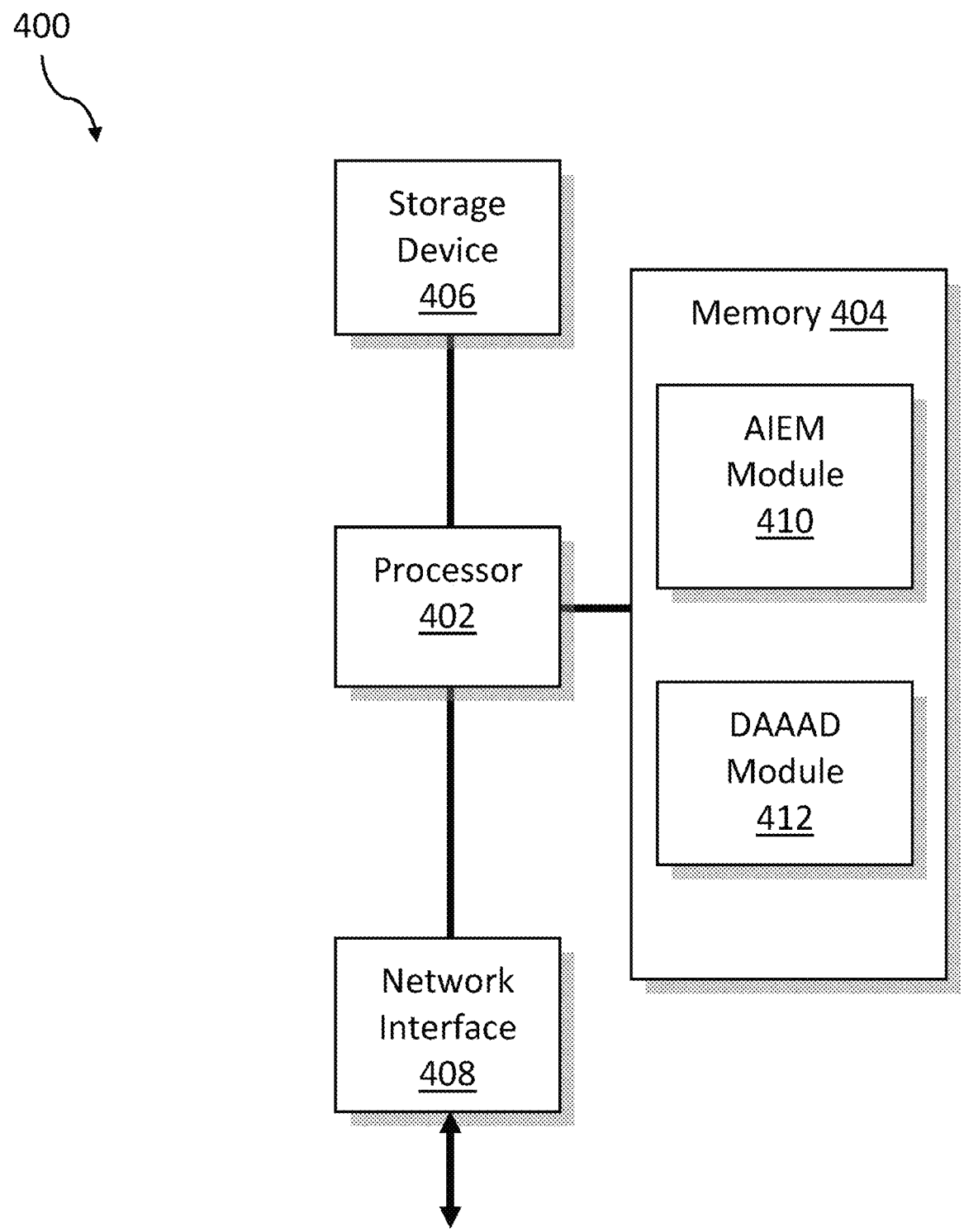
FIG. 4 illustrates an exemplary server system in accordance with embodiments of the present invention.

A block diagram of an exemplary client 300 appears in FIG. 3. A processor 302 executes instructions stored in a memory 304; in one embodiment, the memory 304 includes instructions relating to an artificial-intelligence encryption model ("AIEM") module 318 for dynamically determining a level of encryption suitable for a given client 300 and/or a given threat level and instructions relating to a device-authorization and attack-detection ("DAAAD") module 320 for authorizing the client 300 and/or detecting attacks thereon (as described in greater detail below). The memory 304 may further include instructions for executing an operating system, device drivers, other software components or applications, or any other such instructions necessary for operation of the client 300. The client 300 may also include a non-volatile storage device 306, a display 308, a keyboard 310, a mouse 312, and a network interface 316. The present invention is not limited, however, to any particular client architecture or collection of components. Similarly, an exemplary server 400 is illustrated in FIG. 4 and includes a processor 402, memory 404 (including AIEM 410 and DAAAD 412 modules), a non-volatile storage device 406, and a network interface 408; the present invention is similarly not limited to the architecture or configuration of the server 400 appearing in FIG. 4, and one of skill in the art will understand that embodiments of the present invention apply to any clients and servers, not just those depicted in FIGS. 3 and 4.

In one embodiment of the present invention, with reference again to FIG. 1, a client 102 wishes to communicate securely with a server 112. In one embodiment, upon initial access to the server 112, one or more applications or application components may be downloaded from the server 112 to the client 102. The applications may include stand-alone applications written in C, C++, VISUAL BASIC, shell scripts, or any other similar language, or may be applications for use with an existing run-time environment, such as JAVA or JAVASCRIPT, which may be present on the client as part of, for example, a web browser. The number, complexity, and/or type of the applications or application components may be specified by a system administrator of the server 112 on a per-server or per-client basis. For example, different organizations may require varying levels of security, and the applications or application components may be customized accordingly (as explained in greater detail below).

The server 112 may, in addition, randomly select a subset of applications or application components from a larger pool of the same and transmit only the subset to the client 102, thereby increasing the difficulty for a malicious third party to predict which applications or application components are used by the client. Similarly, server 112 may periodically or randomly update or otherwise change the applications or application components installed on the client 102 for this same reason. The client 102 may authenticate the downloaded applications or application components as legitimately coming from the server 112 by, for example, examining the load time, number of bytes, and/or arrangement of characters therein and comparing these values to, for example, a computed checksum value, with the results of these tests forming a portion of the first key used to encrypt the client's initial reply with test results for the server to analyze.

The applications downloaded to the client 102 analyze the client 102 and/or the user operating the client 102 for one or more items of Fingerprint information. This information may include the hardware present in the client 102, such as the MAC address (or other such serial number or identifier assigned to the client 102), system type (e.g., desktop, laptop, tablet, or smartphone), processor type and/or version (e.g., INTEL PENTIUM, STRONGARM, POWERPC, etc.), firmware type and/or version, attached peripherals (e.g., RAM type or version, hard disk type and/or size, monitor size and/or resolution, etc.), and/or any other such hardware information. The Fingerprint information may further include information regarding the software running on the client, such as operating-system type (e.g., WINDOWS, LINUX, ANDROID, or OSX), installed applications and/or their version (e.g., MICROSOFT WORD, GOOGLE CHROME, APPLE SAFARI, or other types of installed software), and/or application preferences that the user of the client 102 has set or configured (e.g., desktop-interface theme, color, and configuration; web-browser bookmarks; toolbar customization; and/or other such settings). The Fingerprint information may also include information pertaining to the user collected over time, such as keyboard typing rate, mouse movements, typical log-in/log-out or usage-session times, or other such biometric information. The Fingerprint information may be synchronized or otherwise uploaded to the server 112 such that the client 102 and server 112 include identical copies of the collected Fingerprint information. In some embodiments, the Fingerprint information includes information collected at the server 112, such as the IP address or addressing port of the client 102.

In one embodiment, during the login process, one or more of the applications or application components downloaded to the client 102 begin collecting this Fingerprint information and/or begin generating prime numbers (or similar cryptographic data). The client 102 may then begin sending, on a regular, clocked, pulsing basis, (i.e. 10 times per second), a plurality of short (e.g., eight-byte or eight-digit) packages to the server 112; the server 112 responds to each received package with a similar (e.g., eight-byte or eight-digit) response. Each package sent from the client 102 may be encrypted using information such as the last response received from the server 112 (for all but the first package sent from the client 102), the round-trip time of each package sent from the client 102 and received back from the server 112, and/or any Fingerprint information collected by the client 102. Each package sent from the client 102 may depend on one or more responses from the server 112 related to packages previously sent to the client 102. In one embodiment, each package sent from the client 102 and response received from the server 112 are used to create an increasingly larger Merkle tree chain (or similar data structure), where factors based on round-trip times, page sizes, the previous hash value and test time start and stop values create an increasingly longer and more complex key. Thus, a man-in-the-middle attacker would have to emulate the server 112 (with respect to the client 102) for each and every package sent from the client 102; as the history of the sent-and-received packages increases (e.g., the Merkle tree grows in size and complexity), it becomes increasingly more difficult for a man-in-the-middle attacker to emulate. As explained in greater detail below, such an attack attempt may be recognized due to the time required by the man-in-the-middle attacker ("attack detection") and the number of packages sent by the client 102 may vary in accordance with a network/device capability, security protocol, or threat level ("artificial intelligence encryption model") and time required by a user's device to complete the device tests, user input and generate prime numbers for the Diffie-Hellman exchange.

Figure 5:
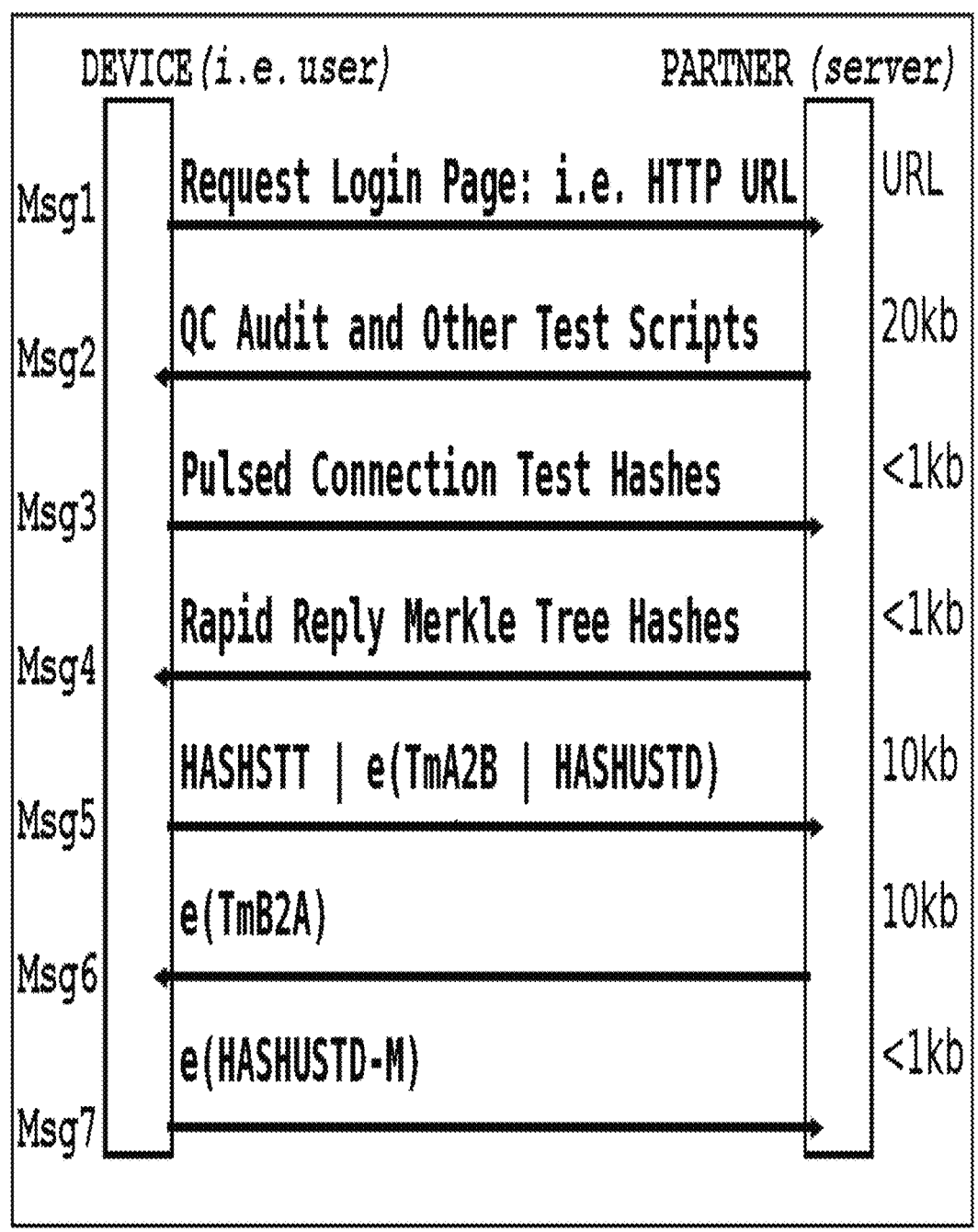
FIG. 5 illustrates a log-in/handshaking protocol between a client and a server in accordance with embodiments of the present invention.

FIG. 5 illustrates an exemplary login process. In a first step, Msg1, a client device requests a login or similar authentication from a partner (e.g., a server, another client, or any other device) via a standard protocol (e.g., TCP/IP and plain text HTTP); in response, in a second step, Msg2, the client device receives (via, e.g., HTML and JavaScript or optionally, local script or an executable stored on the user's device), the first set of tests: QC script audits which the server already knows the answer (i.e. checksum of a script modified by the server before sending), which, depending on device capabilities, may run constantly, checking scripts every few milliseconds at a rate faster than a script injection attack transmission can be performed, and tests which measure static Fingerprints which rarely change, (i.e. available screen size or color depth), creating a branch on a Merkle Tree. The static tests typically complete in less than 10 milliseconds and concurrent to static tests, the client device requesting, acquiring and loading additional tests, either via the transmission connection or from a local script or executable, testing characteristics which vary each session, (i.e. CPU capacity to perform rapid math calculations, prime number generation based on salts, and multiplication of large prime numbers), creating a branch on the Merkle Tree, as well as the connection test which initiates the Msg4 and Msg5 loops, and are composed of a pulsed packet produced by the client sent at a rapid, regular or semi-regular interval depending on the client CPU load, thereby allowing the User and Server to create both a reliable historic database recording connection round-trip times, and a rapidly growing branch on a Merkle Tree based on hashes generated by each transmission which the User and Server now share. The sizes of these first and second transmissions may vary depending on parameters set by the server administrator (i.e., test applications of varying size, complexity and function order and arrangement within the scripts), and the scripts may be changed on an ad-hoc basis by the server, eliminating the ability of a man-in-the-middle attacker from using a previously recorded and potentially altered scripts to trick the client since the hashes include byte counts and other parameters measured in a rapid ongoing cycle of the AIEM QC test. The client creates the pulsed hash sent to the server from a concatenation of the client's timer monitoring events, page loads, test results and test times, and the QC audit of the scripts and pages received, while the server responds with a similar hash, calculated from a hash derived from the byte count and content of the client's package and the server's response time, thereby creating a rapid, pulsed, repeating, clocked exchange of a given size set by the server administrator, embedded in script and programs and known by all parties; i.e. 8 digits per hash packet, thereby confirming the client and server in sync relating to the large, growing Merkle Tree they share, creating a basis for forming a high, low, average and standard deviation table for their expected connection transit times, making it easier to detect any anomalies which may result when a man-in-the-middle is forced to complete more complex calculations in subsequent steps. In Msg5, the client has completed all tests and typed a subset of their User ID; i.e. 1 or 2 characters at a specific position; i.e. "Enter the 4th and 7th character of your ID", and a subset of their next one-time password; i.e. 1 character as in "Enter the 2nd character of your next Password." With these characters entered and all static tests complete, along with the dynamic CPU, Prime number and associated Diffie-Hellman test, and optionally mouse movements, bio-metric tests or other tests which may be added, AIEM login encryption process creates a hash of the concatenated series of hashes from each of the user's standard, static tests, HASHSTD, distilled down to HASHSTT, with the a subset of the User ID 2 alpha-numeric characters; concatenated to an encrypted package of the first step of the Diffie-Hellman exchange, "Alice's Gift to Bob", using a key of made of the User's time tests, connection tests, and results of the page and script audits; in one embodiment, the client includes a two-factor-authentication hash created in a previous session, which can only be recreated by the client using a secret phrase. In one embodiment, the client uses the two-factor-authentication hash to encrypt the "Alice's Gift to Bob", assisting the server in the next step, in determining the correct client from a list of potential candidates. In one embodiment, even if a man-in-the-middle attacker was able to intercept and decrypt the communications in the second, third or fourth steps, the increased complexity of the encryption embodied in the fifth and subsequent steps prevents such a man-in-the-middle attacker from such decryption (without, as explained further below), incurring a detectable delay or increase in the transit time between the communications between the client and the server. In sixth step, the server replies with an encrypted message that the client can only decrypt by completing their full one-time password, and optionally, the phrase used to create the two-factor-authentication hash. Even if a man-in-the-middle attacker had been able to intercept and decrypt the communications based on guessing time required to complete tests, or had emulated the client and performed all tests for the server, the man-in-the-middle attacker lacks the complete password required to decrypt the server's payload quickly enough to avoid detection. Furthermore, if the man-in-the-middle attacker already had the next password, perhaps by phishing the user or spoofing the web site, they would also need the entire secret phrase used to create the two-factor-authentication, or would be forced to guess at what characters are required by the server's encrypted message. Upon successfully entering their full one-time password and 1 or 2 characters of the optional two-factor-authentication phrase, the client replies in the seventh step with an encrypted message using a subset of the Diffie-Hellman shared key, proving to the server they had both the password and secret phrase to decrypt Bob's Gift to Alice, and proving with the payload containing the dynamic, unstandard tests, which match all hashes, that the client's performance matches the device characteristics, connection times and hashes, demonstrating PROOF OF WORK, at which point secure communications has been established. In one embodiment, the shared Diffie-Hellman key is 10,000 to 50,000 digits long, and grows longer automatically as client and server CPU capabilities improve. In one embodiment, the long shared key shared represents a master key, while the actual encryption key used prior to transmitting data is a subset of the master key, with a start and end point determined by a hash of the ongoing pulsed connection test that continues throughout the session at a regular, frequent, clocked pace. In one embodiment, either the server or the client may, using an encrypted alert, request that the client re-calculates the Diffie-Hellman "Alice Gift to Bob", and a new shared key is generated. In one embodiment, further tests and responses may still be exchanged to verify the secure connection therebetween, (i.e. additional challenge questions used when client device parameters and tests are "close", but perhaps the client has upgraded their screen, connection, ethernet equipment or purchased an entirely new device, but other credentials appear to be accurate).

A first login by the client 102 to the server 112 may require the sending of a password from the client 102 to the server 112; this password may be sent using very large (e.g., 2000-bit) keys, however, to provide additional security thereto. Subsequent logins from the client 102 to the server 112 may make use of the previously collected Fingerprint information (and/or collect new Fingerprint information) to allow the client 102 to establish a secure connection to the server 112 without the need for the user of the client 102 to send a password or a full username. In one embodiment, the client 102 attempts to access the server 112; the user of the client 102 is prompted to enter only a subset of characters in a username associated with the user. For example, if the username is fifteen characters long, the user is prompted to enter one, two, three, or some other number of characters less than fifteen such that any virus recording keystrokes or man-in-the-middle attack performing a script injection is unable to acquire a sufficient number of characters to answer an ad hoc request for a specific subset of the full ID in a replay attack. The prompted characters may be contiguous or non-contiguous with respect to the full username and may appear at any position in the username. For example, the user may be prompted to enter the third, twelfth, and fifteenth characters in his or her fifteen-character username. If, for example, the username is created using the common alphabet, which includes upper- and lower-case letters (i.e., a-z and A-Z) and numbers (i.e., 0-9) and special characters such as underscore and other upper register characters, forming a 95 character alphabet, and if a ten-character password and known device is used, identified with 3 static, standard tests which are always the same with each login, creating a unique string of ID(1)|PASSWORD(10)|TES-Ta|TESTb|TESTc, where each test result is represented by a unique 8 digit hash, for a total of 35 alpha-numeric characters; the user's identity as measured by the total keyspace, may be confirmed to an accuracy of one in 38,136,800,256, 227,897,272,064,940,472,866,626,495. When the user is later prompted to enter their full next one-time password, the server is thus able to confirm the correct user with the correct password is attempting to sign in. In various embodiments, the username may be something other than the email address of the user (or other such publicly available and known string of characters associated with the user), such as the URL of a BLOG, or a user name/handle utilized by the user at a web site where the user is able to post comments, text or data freely. In one embodiment, the user selects a unique username for use with communications with the server 112.

The number of characters for which the user is prompted may be configured by the server 112. In one embodiment, a system administrator of the server 112 sets a predetermined number of characters to be entered. In other embodiments, the number of characters is dynamically set in accordance with an amount of collected Fingerprint information; if the collected Fingerprint information is relatively small (if, e.g., the Fingerprinting applications have only been recently downloaded to the client 102 and have not yet collected a sufficient amount of identifying information regarding the client 102 and/or the user of the client 102), a greater number of characters may be requested (e.g., five to ten). If, on the other hand, a relatively greater amount of Fingerprint information has been collected, fewer characters are requested (e.g., one to three).

In one embodiment, the number of characters for which the user is prompted, and/or the relative position of the characters within the username, is determined by the hashes of the various device, biometric and connection tests pseudorandomly. For example, the client 102 may utilize timer data concatenated to form a long, growing string of time stamps, as well as include a hardware or software performance parameters, such as screen size or browser navigator to form a pseudorandom number generator; this generator may be used or otherwise accessed (via, for example, an application programming interface), and the output of the generator may be used to select the number and/or position of entered characters. Random numbers may be also be derived, for example, from prompting the user to operate a keyboard, mouse, or touchscreen interface for a certain period of time and taking samples of the velocity, acceleration, key-press rate, etc., at various points in time; these random numbers may similarly be used to determine the number and/or relative position of the characters within the username. In other embodiments, the selected characters are rotated through the username in sequence or in accordance with some other pattern; for example, if character positions three, twelve, and sixteen are prompted for in a first login attempt, character positions four, thirteen, and seventeen are prompted for in a subsequent login attempt (i.e., each character position increases by one unit on each attempt). In still other embodiments, selection of the positions of the characters in the username is weighted based on the history of prior selections; recently used characters are less likely to be selected, for example.

FIG. 6 illustrates an exemplary login screen that may be presented to a user of the client 102. In one embodiment, as depicted in the upper portion of the figure, the user is prompted to enter a particular character of his or her username, password, and further authentication information (which may be, in one embodiment, an answer to a challenge question). In another embodiment, as depicted in the lower portion of FIG. 6, the user is presented with entry fields corresponding to every character in his or her username, password, and challenge question-and-answer; the user must then navigate input focus (using, for example, a mouse or touch screen) to the appropriate prompted fields or boxes. The mouse movement and/or touchscreen behavior may then be used as further Fingerprint information. In another embodiment, the user is presented with an on-screen or "virtual" keyboard from which the user is to enter his or her username or password; any keyboard-logging malware installed on the client 102, therefore, would not be able to capture any input from the user because any physical keyboard associated with the client 102 is not used to enter this information.

Once the user has entered the subset of characters in his or her username and next one-time-use password, the server attempts to identify the user and then prompt the user to enter their full next one-time-use password. Any method of maintaining and selecting one-time-use passwords known in the art is within the scope of the present invention. In one embodiment, the client 102 may maintain a password vault from which the user may select a next password for use; the password vault may alternatively or in addition be maintained on a portable device, such as a USB flash drive, cellular telephone, or other such device. In other embodiments, a user signing into a third-party site may trigger confirmation by that site to an AIEM Authentication script on another site, which requests portions of a user ID and password, either by data entry or automatically submitted by a local user script, executable software or firmware driven token, which then transmit an authorization and signature hash to the third-party site, confirming the correct user possessing a known device and the correct credentials is attempting to sign in. In other embodiments, each successful login using a one-time-use password provides the user with a next (or next few) password(s) for use during a subsequent login attempt. Still other methods include the use of a reference document, such as a phone book or work of literature; a next one-time-use password may be created and entered in response to a prompt, sent from the server 112 to the client 102, for information contained within a particular page or pages of the reference document (i.e. enter the 4th, 5th and 6th word on page 316 of your favorite book). In one embodiment, one of the applications downloaded from the server 112 to the client 102 includes a tool to allow a user of the client 102 to scramble input data (from, e.g., a reference document) to generate one-time-use passwords or modify the keyboard from a QWERTY to another language or layout; the tool may also provide password and/or challenge-question hints to the user and/or assist the user in hiding passwords in other reference materials, such as images or other data files.

Once the user of the client 102 successfully enters the prompted characters in his or her username and the one-time-use password, data sent to or from the client 102 is encrypted using the characters, the password, and/or the Fingerprint information. The server 112 authenticates the client 102 by decrypting information received therefrom based on the correct responses to the characters in the username, the correct password, and the matching Fingerprint information previously collected by the server 112, this data used to encrypt a package sent to the server, such as the first exchange establishing a Diffie-Hellman shared key. If the server 112 confirms that all of the information matches to what is expected, the server confirms the user by requesting the user enter their full next one-time password, which is used to decrypt the server's response to the initial Diffie-Hellman process and thereafter, upon determining the shared key to be used among authorized parties, a secure communications link between the client 102 and the server 112 is established.

If, on the other hand, some or all of the username characters, password, and/or Fingerprint information does not match, or the connection pulse contains unexpected delays, the server 112 sends a response to the user via the client 102 so informing the user of said mismatch or in a case the server is sure abnormal transit times or data received indicate a man-in-the-middle attack is present, simply closing the connection and warning the user of an ongoing attack. The mismatch triggering a warning may simply be the result of a typing or similar error on the part of a legitimate user (i.e., the user has mis-typed his or her username characters and/or password), while more severe conditions exist when the problem is the result of the user changing his or her client device, IP address, software configuration, or similar Fingerprint information or may be due to older or newer transmission infrastructure changing expected transit times. In any case, the server 112 (via the client 102) so informs the user and depending on the severity of the error, may prompt the user to answer one or more pre-defined challenge questions to thereby prove the user's identity. For example, the user may have previously defined challenge-and-answer questions at the server 112 relating to personal or otherwise publicly unknown information about the user, such as names of friends, family members, or pets, prior addresses, personal preferences in music or movies, or any other such information. Upon an unsuccessful login, the server 112 prompts the user with such a pre-determined question or question; if the user answers with the expected responses, the login may resume and the server may record the user's device test results as a new valid device the user intends to utilize for the session and in the future. In one embodiment, after a challenge-and-response has been used a predetermined number of times (which may be just one time), the server 112 prompts the user for new challenge-and-response information and disallows the use of the already used one (either permanently or for a predetermined amount of time), thereby preventing a replay attack.

If the user gives an incorrect answer to a challenge question, one or more additional challenge questions may be presented. Depending on parameters set by a system administrator of the server 112 and/or the user, the user may be locked out of the server 112 after one, two, three, or any number of incorrect responses. At this point, the server 112 and/or a system administrator of the server 112 (or other persons associated with the operation of the server 112) may attempt to contact the user in an out-of-band communication, via other means, such as via mail, email, or telephone, to verify the identity of the user and/or inform the user of a potentially malicious login attempt. The server may require the User to post a specific phrase or digits at the User's BLOG site known by a URL which may also serve as the User's ID, where the server prompts with a simple message: "Post the digits 9991111 on the Home Page of the BLOG that corresponds to your User ID. You may remove the digits after logging in." If the user is successfully contacted and clicks a confirmation message, or in the second challenge example, is able to sign into their BLOG and post the digits and the server can utilize a simple, known process, such as a WGET to read the page and verify the post, new challenge questions and/or one-time-use passwords may be communicated to the user for subsequent login attempts. In one embodiment, the user may perform an out-of-band account reset by employing the assistance of other users (i.e. member associates), of the same secure system, who a) do not know each other and, b) may also have trusted administrator rights or, c) may be familiar with the user's personal characteristics, their voice, style of writing or facial or other bio-metric features, and d) who together, as a group, have an ability to jointly reset a user's account or provide an out-of-band, multiple, independent, third-party for verification of a user's credentials when other systems, device Fingerprints or challenges fail, this "multiple factor authentication" proven to be a successful basis of secure systems such as Bit-Coin transactions.

In one embodiment, prior to logging into any web site that might be utilizing embodiments of the present invention described below, a web site running the 2FA provides the user with an opportunity to create a random, public challenge: i.e., a geographic location, a favorite baseball team, or short phrase (e.g., "the ocean swell is currently 14 feet out of the NW"). Optionally, the web site URL, a page easily modified by the user, serves as a user ID in the place of a typical email ID; where the secret phrase can be found at the URL; i.e. a blog, online newspaper or media comment page, or even a third-party site with dynamic content, thereby providing an automatic, ongoing expiration of the secret phrase as each user's comment rolls to a second page when new comments are added.

During the 2FA process and other processes described herein, the script quality-control and device test scripts may be running to detect any page, script or timed event anomalies (i.e. byte count of a script, time to perform a given test, number of times the word "function" appears in a script or page, or verification that words such as "EVAL", a known tool for JavaScript hackers, does not appear in a script).

Combined with the connection speed (i.e. the time required to download the page or to send a small packet of data and record the round-trip time for a response), the user input, hardware and software performance tests, installed software (such as operating-system type, installed suite of applications, application preferences and background processes that affect CPU performance), as well as a rapidly changing segment of the user's time stamp and a quality control check of the scripts and web page, and parameters from Tokens, devices or other electronic and biological processes, including but not limited to passwords, PIN, pattern, token, magnetic strip card, smartcard, RFID chip, badge or similar EMF transmitter, USB token, audio port token, software driven token, phone-based token, hard drive, USB drive, SIM chip or any other storage device and associated size, capacity, free space, or other configuration such as a device MAC ID; the time specific static and dynamic fingerprints form a series of digital one-way hash codes; i.e. QC test results QCK, distilled to create a one-way hash, HASHQC, navigator user-agent parameters creating HASHNAV, and other hashes, with examples shown in the sample scripts accompanying the present invention, as well as a growing list of event time stamps; TSK, containing for example, test result completion times, transmission times, page load event and completed test, and together forming a growing Merkle tree chain (or similar data structure) derived from various hashes and transmission socket send and receive byte counts present in SOCKK and its associated hash, HASHSOCK, altogether forming a "proof-of-work" package, as well as hashes derived from the user and user hardware and software performance, HASHSTD ("Static" or "Standard") and HASHUSTD (dynamic or UN-standard); reduced down further to create one-way hashes HASHSTT, HASHUSTT respectively, and an optional HASH2FA; a two-factor authentication code that may be semi-permanent for a period of time, such as a week, and which is easily remembered, easily replaced, temporary and time-sensitive, and may be utilized as an on-demand challenge question. Because the one-way hashes and transmissions contain no password or user ID information, any port—secure https port 443 or insecure http port 80—will suffice for transmission of hashes.

To initiate a session, a user types only one (or at most a few) characters of their User ID and one or at most a few characters of their password, ("UP1"), at positions ("UP1POS") determined according to digits derived from a combination of their current hashes, i.e. HASHQC, HASHSOCK, HASHSTD, HASHSTT, HASHUSTD, HASHUSTT, and optionally, their HASH2FA. At this step the user is only prompted to enter a short subset of their user ID and password; perhaps only one character of each.

When combined with HASHSTD or other hashes available to the server, i.e. HASHSOCK, the user entries serve as a key to encrypt the large Diffie-Hellman "Alice-Gift-To-Bob" ("A2B") exchange consisting of a unique timed-stamp index, "Tm", creating a concatenated package "TmA2B", which later allows the client (Alice) to match all individual A2B Alice generated Diffie-Hellman calculations, and "Bob-Replies-To-Alice" ("B2A") received from the second party, allowing authorized parties to synchronize the long list of shared keys in subsequent transmissions. Each A2B, the Alice-Gifts-To-Bob, may be created in the standard Diffie-Hellman manner of an exponential base, e.g., 2, 3, 5, to a secret exponent, e.g., 500, modulo a prime number, e.g., 17, (or, if exponential math functions are beyond the capacity of a device, utilizing prime products in the form of PaxPb). A single simplified example is 25%17=15 ("BEP"), whereas in real practice the calculations utilize larger numbers in a range and quantity suitable for secure cryptography and within the computing capacity of the authorized devices and related software, and create a series of calculations which both lengthen the resulting keys and add values to the Merkle Tree hashes utilized by the AIEM/DAAAD system.

The client may create the base, secret exponents, primes and optional prime products on demand, and concatenates multiple calculations of BEP, and utilizes the concatenated UP1|UP1POS, and HASHSTD, to create the key k(UP1|UPPOS|HASHSTD), and optionally, to create a stronger, safer key, other hashes which the Second party already knows; i.e. k(UP1|UPPOS|HASHSTD|MoreHASHES) or k(UP1|UPPOS|HASHSTD|HASHSOCK), and optionally an even longer and safer key with the 2FA hash, k(UP1|UPPOS|HASHSTD|MoreHASHES|HASH2FA) when two-factor authentication is employed. The key is used to create an ENCRYPTED TmA2B PACKAGE, e(TmA2B), concatenated to the dynamic test results reflected in HASHUSTD to create e(TmA2B|HASHUSTD), growing longer as the Client appends each TmA2B calculation. Any practitioner familiar with the Diffie-Hellman exchange needs only to be able to create and use the large growing series of hashes derived from the fingerprints, and the creation and use of the well documented Diffie-Hellman A2B and B2A gifts, and thereafter navigate creation and use of the large shared keys for further transmission in order to use the AIEM segment of the AIEM/DAAAD system and create an encrypted e(TmA2B|HASHUSTD) package, concatenated to the plain-text HASHSTT string to create HASHSTT|e(TmA2B|HASHUSTD); sent from the Client (Alice) to the Second party, i.e. a Server (Bob). Any practitioner familiar with device performance characteristics, such as browser type, user agent, screen size, CPU clock speed, mouse movements and round-trip transmission times, and who can detect anomalies in time stamps, device and user fingerprints or round-trip times, and furthermore, who can convert long strings of digital data to one-way hashes, can develop and manipulate the Fingerprints that make up the DAAAD portion of the AIEM/DAAAD system. Because the user's full username and password is never transmitted it is impossible for a malicious third-party lacking the ID and Password to hijack a session with the intent of gaining full access to the account, having at best only a single plain-text hash and encrypted ad hoc A2B package, and ad hoc dynamic tests, together forming the transmitted package HASHSTT|e(TmA2B|HASHUSTD).

Using a best-guess or most likely methodology, as described in the examples below, or when available, a Quantum Computing model utilizing the characteristics of imprecise data providing a most likely candidate and incorrect data, while close, warping and eliminating the ability of determining the likely candidate, upon receipt of the HASHSTT|e(TmA2B|HASHUSTD) package and an encrypted Diffie-Hellman e(TmA2B) package, with the embedded encrypted HASHUSTD, and prefaced by the plain-text HASHSTT, the second party, i.e. a server, first checks for existence of a file name matching a string created by concatenating HASHSTT with the first portion of the IP address indicating the user's network; i.e. using an example of an IP address of 123.456.789.248, and a HASHSTT equal to 22223333, a filename of 123456_22223333. Users must exist on the server or the second party server can assume this user, regardless of whether they are valid or not, is attempting to access the system through a new or unusual network and therefore, no other work is required by the server until the user validates their identity and thereafter authorizes this new transmission path through a series of challenge questions. To accommodate dynamic IP address changes and transient IP address lease times, only the first portion of the IP address is compared to each user, thereby ensuring the server can recognize a user who is on the same network, but who may have a slightly different IP address, and not inconvenience the user with a constant barrage of challenge questions with every login. Assuming the file does exist, i.e. 123456_22223333.users, the second party server scans each entry within the file for various HASHSTD entries, and cross-references each of these to valid user IDs and next one-time passwords, narrowing users to likely candidates, i.e. those known to make connections on a given IP address, or with a similar device producing a similar HASHSTT, and narrows the list of candidates further to create a subset of users with a tolerable or zero collision rate, using the hashes and the correct character in the correct position of their respective user IDs and passwords, thereby creating and testing a limited number of keys in the form of k(UP1|UPPOS|HASHSTD|MoreHASHES), and to reduce server loads and quickly refine the list of candidates, optionally using 2FA within k(UP1|UPPOS|HASHSTD|MoreHASHES|HASH2FA) combinations. Each tested key created from the list of candidates is checked for its ability to decrypt the initial HASHSTT|e(TmA2B|HASHUSTD) package received from the client. In the event the collision rate exceeds server capabilities, the AIEM system administrator may reduce the load by requiring more characters of the user Id or password, which, when combined with the relative positions of these characters, quickly reduces the list of candidates, or require a two-factor authentication thus providing HASH2FA, or utilizing other tests or known, standard hashes, i.e. from a hardware or software token or local script or executable, thereby allowing the second party to quickly confirm a specific candidate, as well as utilize challenge questions for validating users who may be on a different device which produces different test results, an upgraded device, or utilizing a new connection path; i.e. different IP address. Furthermore, the HASH2FA mechanism, which represents a one-way hash of a secret phrase can be utilized via a user ID in the form of a URL which matches a valid candidate, whereby the second party can confirm that the "secret phrase exists at the User ID URL, which produces the HASH2FA calculation", such as "the wind is 14 knots out of the northwest", or "this singer's third video is awesome", thereby confirming the HASH2FA, the full user ID within the database of valid users held by second party and reducing the possibility of collisions to a rare and manageable level. In embodiments of the present invention where a large list of potential candidates within a large population possess similar devices and fingerprints, operating on the same IP address, to further reduce the list of candidates, concatenating a hash derived from UP1|UPPOS ("HASHUP|UPPOS"), to the plain-text HASHSTT, provides the server with a tool to quickly test each candidate to determine which user ID and appropriate character and relative position, combined with a password character and relative position. Concatenating HASHUP|UPPOS to HASHSTT and HASH2FA, as well as the first 6 digits of an IP address ("IP2"), creates a 30 digit code, with a keyspace and collision rate of of 1 in 1.11× 1030, which a brute-force attack at one hundred trillion guesses per second will require 3.53 million centuries to decipher; whereas a server in possession of these four pieces of data can easily narrow the list of candidates to a single entry.

Upon narrowing down the list of Candidates to a specific user, optionally with additional test results and hashes, i.e. HASH2FA, or examination of the User ID URL page obtained with a simple Server-Side WGET, the Second party tests their "Quantum Computer" guess by creating k(UP1|UPPOS|HASHSTD|MoreHASHES) or k(UP1|UPPOS|HASHSTD|MoreHASHES|HASH2FA), then successfully decrypting the e(TmA2B|HASHUSTD) package, and when successful, the Second party has acquired both TmA2B and HASHUSTD. Once A2B has been acquired by the Second party; i.e. a Server, also commonly referred to as "Bob" in the Diffie-Hellman exchange, the Second party can convert the multiple A2B calculations, indexed individually by each Tm time code, and calculate the Bob-Reply-To-Alice package which will provide the User with the ability to create the secret shared key. The Second party parses the A2B package into individual Primes which were used in the Mod portion of the Diffie-Hellman calculation, and final Products, then performs a similar calculation, as performed by the User; i.e. a simplified example being 27%17=9, where the agreed starting base is 2, the secret exponent, which is retained by the server is 7, and the shared prime received from the user was 17, and the final product is 9. A series of these calculations corresponding one-to-one for each TmA2B segment received, are concatenated to create a TmB2A reply. In this process the Second party Server also creates the first series of Diffie-Hellman shared secret keys, k(TmA2B_TmB2A), now known to the Second party; i.e. using the calculation 157%17=8, where 15 was received from the user's encrypted TmA2B package, 7 was the server's secret exponent, 17 is the shared prime and the final product 8 becomes the Diffie-Hellman secret shared key in these simplified examples. Upon receipt and decryption of the server's B2A package, the client has received the server's product, 9, and can compute the secret shared key 8 from the standard Diffie-Hellman calculation of 95%17=8, where base 9 was received in the B2A package, the secret exponent held by the user and applied in the user's previous calculation was 5, and the shared prime known by all parties is 17. Prior to encrypting the B2A package to be sent, the Second party concatenates a hash ("HASHFNOTP") of the full next one-time password, ("FNOTP"), which is immediately flagged as "USED" and can never be utilized again, regardless of the user's success or failure at logging in, and HASHUSTD, both concatenated to the key created by the user, k(UP1|UPPOS|HASHSTD|MoreHASHES), thereby creating a new key k(UP1|UPPOS|HASHSTD|MoreHASHES|HASHUSTD|HASHFNOTP), or optionally using 2FA, k(UP1|UPPOS|HASHSTD|MoreHASHES|HASHUSTD|HASHFNOTP|HASH2FA), and with the new key encrypts the first B2A package which may contain multiple calculations; i.e. equal to the number of calculations sent by the user and reflected in each time stamp Tm, or alternatively for a much stronger key, the server may utilize a larger set of server-side secret exponents and common primes to create a superset of B2A calculations, which upon receipt provide the user with additional data to create a much longer list of shared keys.

While the standard Diffie-Hellman calculation shares the base in the open; generally a prime number and in this simple example base 2; since the A2B and B2A packages are encrypted the base may be varied and included in the A2B and B2A packages thereby creating a far more difficult series of calculations for any brute-force attack. In any case, the second party server combines the associated time stamps with the products of each calculation in B2A, to create TmB2A, encrypts this with the selected key, i.e. k(UP1|UPPOS|HASHSTD|MoreHASHES|HASHUSTD|HASHFNOTP|HASH2FA), and returns the encrypted package e(TmB2A) to the Client.

This key, which neither contains the full next one-time password, nor is the password found in plain-text or within any encrypted data, provides one of the mechanisms which the server uses for several purposes; a) authenticating a valid user and, b) allowing the server to detect an abnormal delay due to a man-in-the-middle attacker attempting to emulate a user in an Oracle attack or submitting A2B packages in a Diffie-Hellman spoiler attack. Only a valid user can type their full next one-time password and therefore recreate k(UP1|UPPOS|HASHSTD|MoreHASHES|HASHUSTD|

HASHFNOTP), or optionally using 2FA, k(UP1|UPPOS|HASHSTD|MoreHASHES|HASHUSTD|HASHFNOTP|HASH2FA), and thereupon decrypt the first B2A package sent from the server. Furthermore, this process also provides the client with a mechanism for a) authenticating the second party, i.e. a server, who holds the full next one-time password, user ID and STD data which is generally the same for each session, as well as b) detect an abnormal delay if a man-in-the-middle attempts a brute force attack on the key the client created; k(UP1|UPPOS|HASHSTD|MoreHASHES) or k(UP1|UPPOS|HASHSTD|MoreHASHES|HASH2FA) as the case may be. To strengthen the authentication portion of this process and further reduce risk of a substantial loss, or simply reduce risk of revealing passwords, instead of creating the key k(UP1|UPPOS|HASHSTD|MoreHASHES|HASHUSTD|HASHFNOTP), or optionally using 2FA, k(UP1|UPPOS|HASHSTD|MoreHASHES|HASHUSTD|HASHFNOTP|HASH2FA), which encrypts the first B2A package from the server, the server may choose an extended authentication process ("EAP") and thereupon request a single (or only a few) character(s) of the user ID or full next one-time password, known to a valid server and a valid user, which the user did not supply in the first prompt; i.e. 4 characters encoded as UP4|UPPOS4, and thereupon create a hash, HASHUP4UPPOS4, and associated key k(UP1|UPPOS|HASHSTD|MoreHASHES|HASHUSTD|HASHUP4UPPOS4), or optionally using 2FA, k(UP1|UPPOS|HASHSTD|MoreHASHES|HASHUSTD|HASHUP4UPPOS4|HASH2FA), which is then used to encrypt the e(TmB2A) package. The request for 4 additional characters may be concatenated to a plain-text prompt; in this example, requesting the last 4 characters of the password; i.e. L4|e(TmB2A) returned from the server, or to protect the e(TmB2A) package until a full next one-time password is requested, simply. L4|e(HASHUSTT), where the server reduced HASHUSTD to a smaller one-way hash, HASHUSTT which reveals nothing about either the actual tests or the HASHUSTD underlying hashes. In this example, the user would be prompted to "Enter the last four characters of your next one-time password and press SUBMIT within 10 seconds", where "L" represents a command variable to setting the key-word in the prompt to "LAST," and "4" sets the number of characters requested. A similar prompt could be 24|e(TmB2A), requesting 4 characters beginning at the 2nd character, or other encoded prompt method according to a practitioner's specific design, sizes of passwords and user ID; but in any case, at no time requesting a full ID or full password until the authentication process is complete to all authorized parties and no abnormal delays, scripts or test results have been detected. The authentication process provides another test; the user's bio-metric response, their ability and time required to type 1 or only a few characters and press enter. Only a valid user can quickly accomplish this task, or at least within expected start and stop time limits reproduce 1, 2, 3 or 4 characters on demand; as a general rule, younger, healthier users usually provide a faster prompt and typing response times, and regardless, an average time for each account holder, as well as standard deviations are trivial to retain and use for comparisons. A man-in-the-middle attacker would have to know these historical guidelines as well as guess what the "last four characters" are or guess the values and pace they should be entered, which creates a problem clearly illustrated in the case of "Enter the Last 4 Characters"; a guess in the realm of 1 in 82,317,120, thereby providing both the user and second authorized party with a mechanism for easily detecting abnormal delays and authenticating that only authorized parties are producing and answering prompts and encrypting and deciphering Diffie-Hellman A2B and B2A packages.

Whether after the first prompt or after series of partial ID or Password prompts, once satisfied an authenticated relationship exists the user is then prompted for their Full Next One-Time Password, FNOTP, which when combined with HASHUSTD, and allows the Client to create the key k(UP1|UPPOS|HASHSTD|MoreHASHES|HASHUSTD|HASHFNOTP) or k(UP1|UPPOS|HASHSTD|MoreHASHES|HASHUSTD|HASHFNOTP|HASH2FA), (or k(UP1|UPPOS|HASHSTD|MoreHASHES|HASHUSTD|HASHUP4UPPOS4), or k(UP1|UPPOS|HASHSTD|MoreHASHES|HASHUSTD|HASHUP4UPPOS4|HASH2FA) during the extended authentication process), and is thereby able to fully decrypt e(TmB2A) or verify the server by decrypting the initial HASHUSTD within e(TmA2B|HASHUSTD) which the user already has. After one or more authentication tests, when the final test utilizes HASHFNOTP in the key and the user has successfully typed their full next one-time password, this step allows the client to confirm and synchronize the first shared Diffie-Hellman keys k(TmA2B|B2A), now known only to the authorized parties. Upon successfully acquiring the shared Diffie-Hellman keys, the client creates a HASHTmA2B|B2A derived from the decrypted e(TmB2A) and the calculated shared secret key k(TmA2B|B2A), now known by all Authorized Parties, which when concatenated to HASHUSTD, produces a longer, growing HASHUSTD which constantly mutates for the rest of the session by continually changing, at the least, from a new hash with every key change and even more frequently, if the socket connection hash, HASHSOCK is also allowed to mutate and thereby modify HASHUSTD; hereafter called HASHUSTD-M for its ability to rapidly mutate and yet is constantly known to authenticated parties, without transmission, but never known to a third-party man-in-the-middle nor easily deduced at a later date. Using this hash a SUBSET of the large shared Diffie-Hellman keys k(TmA2B|B2A) is selected to create a one-time-pad key, k(OTPDH), which is used to encrypt HASHUSTD, to create e(HASHUSTD-M), which is then returned to the Second party, i.e. the Server, shortly after the user has finished typing either their full next one-time password, FNOTP (or optionally UP4|UPPOS4 during a prolonged, stronger authentication process), and create HASHFNOTP or HASHUP4UPPOS4. While the DAAAD portion of the AIEM/DAAAD system is auditing connection times to detect an abnormal delay which might indicate a man-in-the-middle attacker is performing calculations in an attempt to determine keys, full or partial password with a real-time brute-force attack, and even though such a real-time attack is considered impossible in the present time, in the future, a super-computer array of CPUs or GPUs may be able to break the original user key of k(UP1|UPPOS|HASHSTD|MoreHASHES|HASH2FA) in real-time at a speed that is within the approximate parameters of transmission round-trip times, and thereby shield such a delay from detection. However, as the AIEM system expands keys and hashes automatically proportional to improvements in CPU and device performance, it is highly unlikely that even in the future the potential "delay" caused by a real-time brute-force attack against the new key is possible without detection; i.e. k(UP1|UPPOS|HASHSTD|MoreHASHES|HASHUSTD|HASHFNOTP|HASH2FA), which in a simplified example of "Z1141112341234123412341234123412341234123412341234 1234123412341234 12341234123412341234123412341234123412341234My_ Secret_Password12341234", creates a keyspace of 1.42× 10253, currently estimated to require 45.25 trillion trillion trillion trillion trillion trillion trillion trillion trillion trillion trillion trillion trillion trillion trillion trillion trillion centuries using a massive array brute-force crack at a rate of one hundred trillion guesses per second to decypher e(HASHUSTD) derived from the original tests, or e(HASHUSTD-M), the mutating entry of the Merkle tree, with roots stemming from the first fingerprint tests on the user's device, followed by connection tests, bio-metric tests, mouse movements, user ID and password entries. Such a complex Merkle tree, or brute-force attack on the full passsword and the resulting delay of any such attack or forgery easily detects a man-in-the-middle or oracle attack; for without all of the credentials, parameters, tests, hashes and the clincher, a valid FNOTP and associated HASHF-NOTP, to create a valid k(OTPDH) and e(HASHUSTD-M), as described in the current, accepted definitions and limitations of both conventional brute-force attacks and quantum computing calculations, any single forged or altered parameter will warp the hashes or fail to provide authentic proof-of-work hashes, or fail to include all data known only to the authorized parties. Performing a perfect forged series of tests in real-time, even with a large super-computer array, is considered impossible with current technology and according to current predictions and historical trends in CPU development, highly likely to remain impossible in near and distant future; especially when AIEM key sizes, primes and key strength all grow in length automatically as computer performance improves.

In any event, at no time were the original user ID, partial or complete passwords or Diffie-Hellman Gifts of A2B or B2A or the synchronizing time stamps "Tm" sent in plain-text, eliminating the ability of a Man-In-The-Middle attacker to either modify or record the packages for either a Spoiler Attack in real-time or a passive attack in an offline analysis, thereby forcing a Man-In-The-Middle to either perform all calculations in real-time to brute-force attack the user keys k(UP1|UPPOS|HASHSTD|MoreHASHES), or k(UP1|UPPOS|HASHSTD|MoreHASHES|HASH2FA) or server keys k(UP1|UPPOS|HASHSTD|MoreHASHES|HASHUSTD| HASHFNOTP), or k(UP1|UPPOS|HASHSTD|MoreHASHES|HASHUSTD| HASHFNOTP|HASH2FA) as the case may be. Nor can an attacker forge the initial test hashes which created the HASHSTT|e(TmA2B|HASHUSTD) package, and continue the Oracle attack, which would fail to produce the proof-of-work reflected in UP1UPPOS, or UP4|UPPOS4, and the HASHUSTD and mutating HASHUSTD-M hashes developed primarily by the client tests, including socket transmission data recorded and thus shared by both client and server, and would completely lack the long HASHSTD within k(UP1|UPPOS|HASHSTD|MoreHASHES), known only to the authorized parties, thereby warping the transmitted data which would cause the second party server to fail to locate a valid candidate, as explained in the best guess process above and examples below. In the event a man-in-the-middle has acquired HASHSTD and is able to forge the UP1|UPPOS and successfully guess the 1 in 82,317,120 UP4|UPPOS4 data, only practical if the attacker has acquired the full user ID and password through multiple phishing attacks, it is thereby impossible since a user's one-time password changes with each login and the attacker will then still need to guess in real-time the values included in k(UP1|UPPOS|HASHSTD|MoreHASHES|HASHUSTD| HASHFNOTP|HASHUSTD), and optionally, in k(UP1|UPPOS|HASHSTD|MoreHASHES|HASHUSTD| HASHFNOTP|HASH2FA), which also includes a two-factor authenticated hash potentially created several days prior to the login and potentially at a different location with a different connection path, and thereafter encrypts the server's e(TmB2A) reply; where any delay caused by forgery or a brute-force attack becomes trivial to detect by the authorized parties. Any data revealed in such an attack does not represent a substantial loss; consisting only of the one-way hashes which do not reveal the underlying calculations, test results, user ID or password, simply consisting of the transient ad hoc prime numbers, mod and dynamic hash calculations present in TmA2B and TmB2A; also useless in a subsequent login without the full test array to produce the hashes used in the Merkle tree which are reflected in the original prime numbers. At no time is the user's full ID or password sent, either in plain-text or encrypted form, serving only as a basis for a one-way hash used in a key concenated with other hashes within the various keys encrypting the users e(TmA2B|HASHUSTD) package and the server's e(TmB2A) reply.

Concurrent with the login, device and biometric testing processes, the client is performing an ongoing connection test. While scripts, devices and the user's performance are being recorded, evaluated, digitized and reduced to hashes used to create a Merkle Tree, the client is posting to the second party on a regular, timed, pulsed basis with ongoing connection tests containing either encrypted packets ready for transmission, or when no encrypted packets are available, a rapidly calculated hash derived from one or more hashes to provide an ongoing audit trail of proof-of-work the second party can use to verify hashes on demand, but which an attacker can never duplicate in real-time on demand. An example of a calculation that takes place in under 5 milliseconds on an ANDROID BIONIC, and less than 3 milliseconds on an INTEL I-5 with 4 GB of RAM running a LINUX OS, is the HASHSOCK calculation, derived from byte counts of each send and receive package stored in a growing SOCKK. Any undue delay based on the user's transmission statistics and known device, produced by a user who already knows the data required for the generation of the hashes, keys and full, next one-time password is easily detected by the Second party. If scripts were received intact, as determined by the AIEM QC test, or by a locally stored AIEM QC test in the form of scripts or executables located on the client device, abnormal delays are easily detected by the Client as well.

The full TmA2B and TmB2A packages consist of multiple Diffie-Hellman calculations, forming the shared key k(TmA2B|B2A) package of 10,000 to 50,000 digits or more; which grow longer automatically as CPU capabilities improve and the number and length of the underlying exponential products and primes increases. Therefore by default, the B2A package size is proportional to the TmA2B package and proportional to the underlying data, thereby automatically matching server encryption strength to client CPU capabilities. To strengthen the k(OTPDH) key further, once the shared k(TmA2B|B2A) key is known to authorized parties and full session encryption begins, subsequent encryption are based on the shared Diffie-Hellman key which forms the foundation of a key strengthening routine ("KSR"). The KSR uses k(OTPDH) to create a large integer array of mime characters ("LIAM"), which change with every transmission and serve as the final key. whereby every plaintext character within a plain-text or binary data is encrypted according to a different cipher pattern present in each LIAM entry; and where both the strings within blocks and the blocks themselves are folded, mixed and resorted, altogether a moving-target keyspace of well over 50,000 characters in a process that requires a substantial overhead known to be within the CPU capabilities of all authorized parties.

Assuming the user promptly returns their encrypted e(HASHUSTD-M) package, created using a large key k(OT-PDH), which was a subset of the large Diffie-Hellman key k(TmA2B_TmB2A), and selected based on the HASHUSTD-M, the parties can assume a known user with a known device and known performance characteristics working on a reasonably reliable transmission path, has provided valid credentials to an authentic second party and together, created a large Diffie-Hellman shared key used to encrypt the user's reply, e(HASHUSTD-M) which the second party can quickly decrypt. From this point forward, the connection pulse round-trip tests can continue to monitor the transmission path or transmit any encrypted data ready to send and decrypt any data received, and the authorized parties have created a trusted, reliable, highly encrypted secure socket using a rapidly changing key, k(OTPDH), derived from a much larger key, k(TmA2B_TmB2A), which mutates with every transmission according to HASHUSTD-M, automatically and continuously at a length determined by the Administrator of the Secure Server and modified by the user's actual CPU capability. k(OTPDH) keys generated by devices in the range of an ANDROID BIONIC up to a PENTIUM I-7 are typically 2,000 to 5,000 bits long. Generally an INTEL I-5 CPU with 4 GB of RAM produces a k(OTPHD) about 30% faster, and hence longer than an ANDROID BIONIC, and an INTEL I-7 CPU with 16 GB of RAM produces keys nearly twice as long.

Any man-in-the-middle attacker using script injection or who modifies scripts or pages sent to the user during either the initial QC and testing process, or during entry of any user data, will change the performance hashes, including hashes based on connection times, load times and script byte counts and function titles and contents, as well as trigger delays from the burden of their man-in-the-middle calculations. Any man-in-the-middle attacker who completely spoofs the user with plaintext pages that run only attack scripts, phishing for ID, password or hash information runs into several obstacles; their start and end time stamps for tests won't match the user's device parameters known to the server from previous sessions; the attacker won't know the user's ID, since it is never transmitted, and will therefore need to phish the user potentially several hundred times before obtaining the full ID or if partial passwords are used to authenticate parties, several thousand times to acquire all combinations of ID and passwords (which are one-time pads anyway, and therefore useless later), and therefore be unable to provide the correct single User ID and password characters in the correct positions on demand. Since the one-time password acquired can be set to expire immediately, not just by attempting to log in or experiencing a successful login, but simply by accessing the account, this method eliminates an ability to check and verify either any ID information or any passwords acquired. Furthermore, the HASH2FA expires, as does the secret phrase which created it, eliminating the ability of a hacker from producing two-factor-authentication keys. A user who attempts to log in multiple times and who is unable to do so because their transmissions are always defective and the defect is detected by the Second party is easily placed into a state in the Server's hacker/blacklist database of extreme caution, and thereafter forced to provide answers to a series of challenge questions and optionally, respond to an email or 2FA code sent to their mobile phone, or in the case of financial institutions, even attend a personal call or other out-of-band transmission to release a corrupt account flagged for highly suspicious activity. At no time during such an attack has the user lost funds, lost control of access to the account to a third party, lost their ID or any useful password, nor has the server provided any account data which might be deemed a significant loss. Furthermore, since a huge amount of work must be performed by the User's CPU prior to any substantial work being required of a second party, a denial-of-service attack which lacks either a proper format or expected content, becomes trivial for the server to detect and ignore without being forced to perform any significant amount of work, without having to search for valid candidates or perform any decryption whatsoever; As soon as an invalid IP address and HASHSTT combination is received, with a simple examination of the server's file directory for the existence of a filename matching the HASHSTT and IP segment, lacking a match the server simply sends the user to a registration or log in problem page. In the event of a hammering DOS attack, the server can quickly eliminate any requirement to respond to offending IP addresses by appending the line deny from 123.444.666.999 to the server .htaccess file (in the case of an APACHE server), and then remove the line after a DOS attack has subsided or a period of time has passed.

Figure 7:
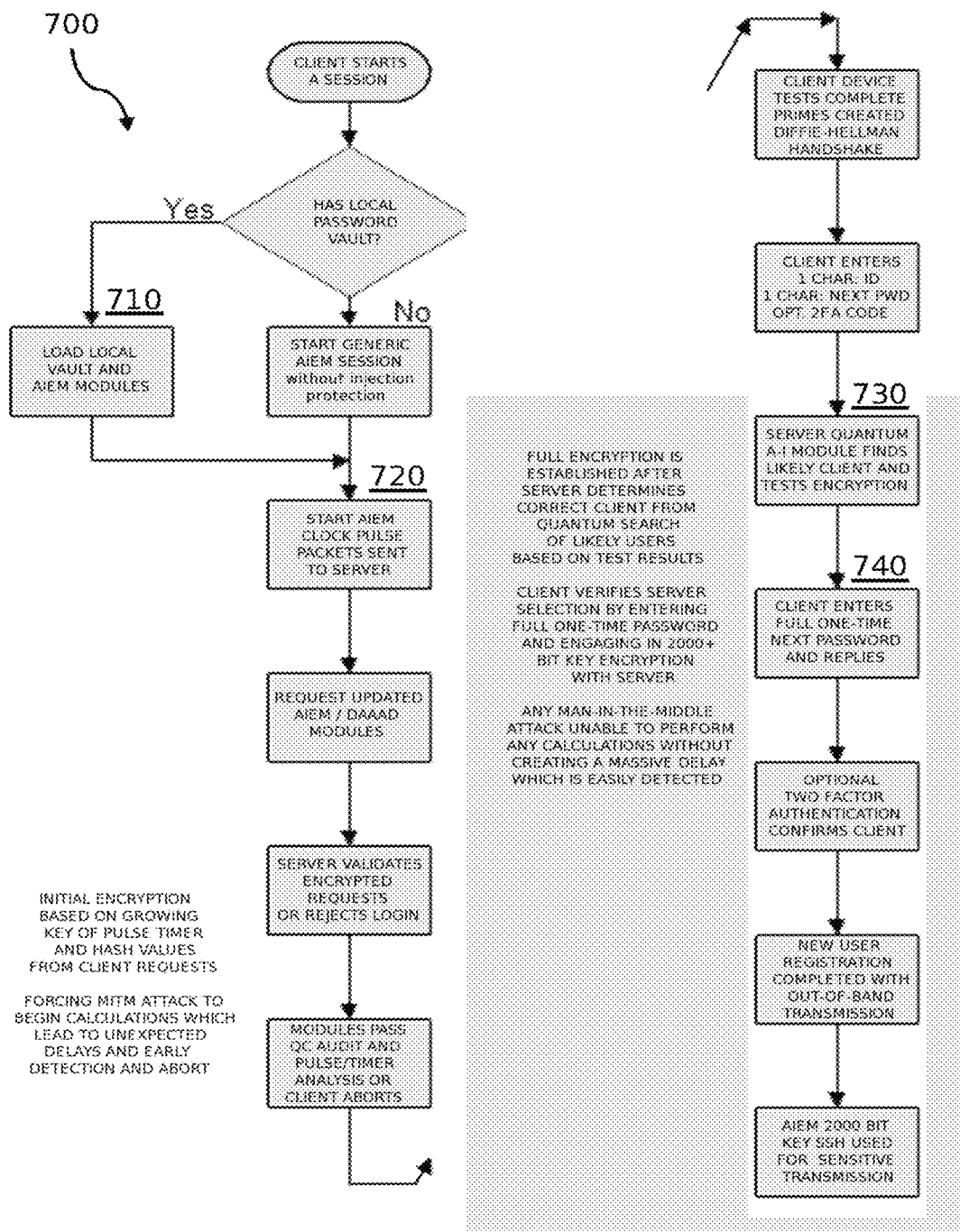
FIG. 7 illustrates a simplified log-in flow chart in accordance with embodiments of the present invention.

FIG. 7 illustrates a two-column flow-chart of an exemplary login screen that may be presented to a user of the client 102. In one embodiment, as depicted in the upper left portion of the figure, the user has a local compiled program for their CPU; 710, (i.e. C program, or simple JavaScript), which either generates required scripts, web pages and prompts on demand, or optionally, utilizes the common WGET method for requesting and immediately auditing all subsequent scripts, before presentation of prompts to the user or performing device tests of the system; thereby preventing any form of a script injection attack or any other potential modification of scripts run by the user. A JavaScript example of the QC process auditing 31 Fingerprints of scripts is provided below. In the same figure, in 720, the user's client pulses the server with small, plaintext hashes of QC results as they are produced until the encryption modules is loaded. Any man-in-the-middle oracle attack will need to begin calculating both static and dynamic QC values to produce the same hashes, thereby producing an easily detected delay. On the right side of the flow-chart, at 730, the user has provided 1 character of their user ID, plus one character of their password, and in this embodiment, the easily remembered hash of their temporary two-factor-authentication code. This information, along with the hash of the QC tests and Fingerprints is sufficient for the server to utilize a Quantum Computer, as defined by an ability to narrow a multi-set instance of potential collisions to a precise user, by decrypting the user's e(TmA2B|HASHUSTD) package, and thereby determine the precise user, in far less time than any man-in-the-middle attacker could using a brute-force attack to decipher e(TmA2B|HASHUSTD) by attempting to deduce the key k(UP1|UPPOS|HASHSTD|MoreHASHES|HASH2FA).

When the server replies with a encrypted packet, which includes the full Diffie-Hellman shared keys, B2A, and the key includes the full one-time next password, which has never been transmitted in this session, and the user types this full password in at 740 and replies, any man-in-the-middle oracle attack is forced to calculate all keys utilized thus far, plus the full one-time next password in order to hijack a session which is already fully encrypted by a key of over 2,000 bytes. While computer capacity may improve in the future to perform such a brute-force attack, the AIEM KEY automatically grows longer and stronger as CPU power improves. Any man-in-the-middle listening attack who garners all information provided to break the session later, is faced with key lengths of 2,000 or larger, as well as at best, decrypting a one-time use next password which can never be verified as correct again.

Figure 8:
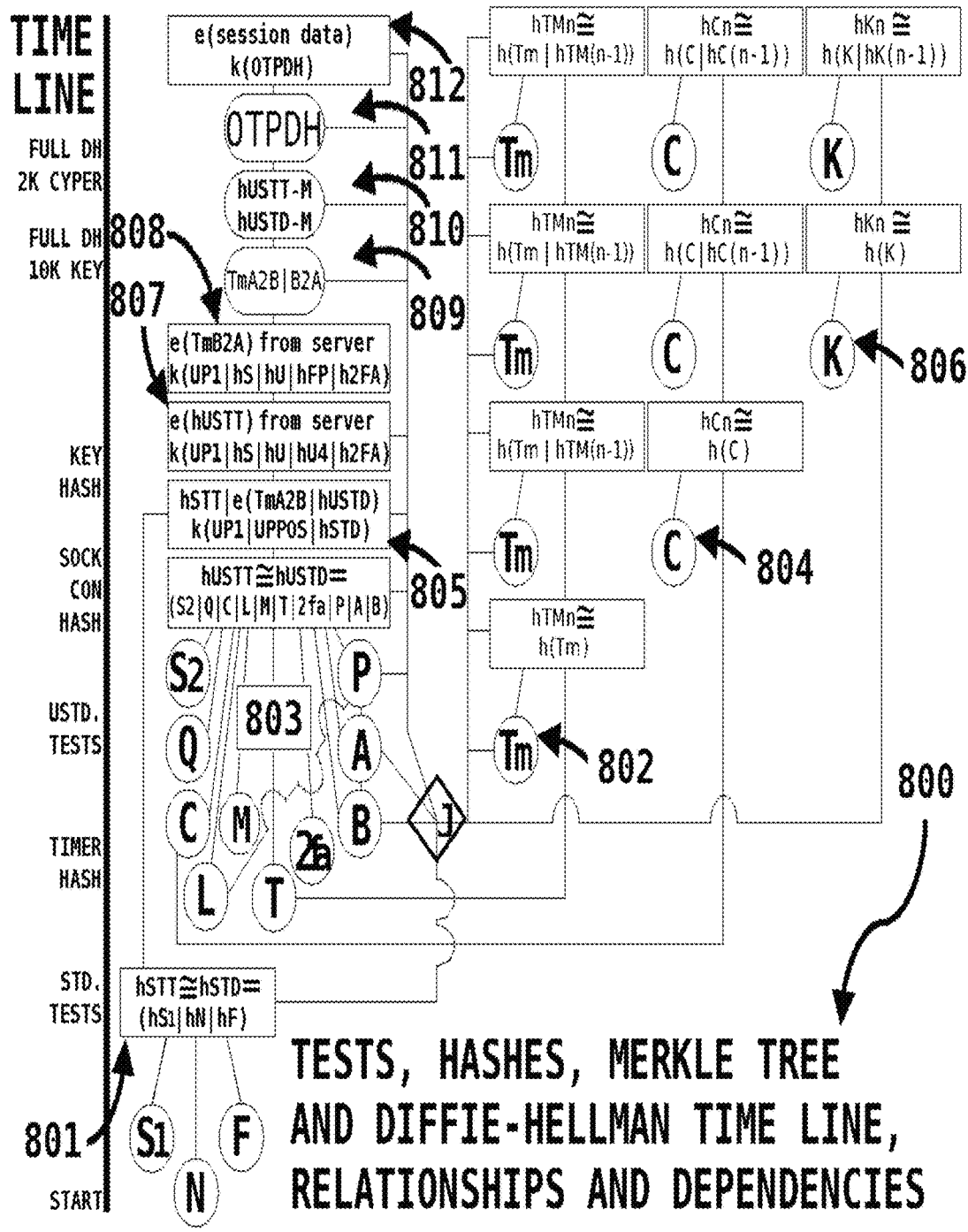
FIG. 8 illustrates a more complex time line of the tests and creation of hashes from test data, how hashes serve as salts and components to create a complex, continuously exanding Merkle Tree, primes, keys, A2B and B2A packages, the 10 kB-50 kB master Diffie Hellman key and the 2K one-time Diffie-Hellman key, leading to fully encrypted session data in accordance with embodiments of the present invention.

FIG. 8 illustrates one embodiment of the present invention during a login at a web site, following a time line from the first test in 801, through establishing a fully encrypted session shown at 812, based on a 2 kB one-time-pad Diffie-Hellman key substring shown at 811, derived from a 10 kB-50 kB master Diffie-Hellman key, shown at 809.

After requesting a login page, the first step for the client is to load the scripts to perform the Static Standard Tests; i.e. in this embodiment composed of three tests in the suite and shown at 801. The first test, labeled "S1" within the circle, stands for the first Screen Test measuring maximum capabilities which rarely change from session to session, i.e. available height and width based on JavaScript commands, e.g. max_height=screen_availHeight, and other commands described in the screen test sample script. The client browser navigator and plug-ins are also tested, labeled "N" within the circle, and installed fonts labeled "F" within the circle are also tested. Test results are reduced to a one-way hash and the hashes are concatenated to create HASHSTD, or hSTD as shown above the 801 Standard Test suite; which would contain 3 different hashes; one for the screen test, one for the navigator test and one for the font test. HASHSTD is reduced further to a single one-way hash, HASHSTT, also shown as hSTT in the box labeled 801. HASHSTT is congruent to HASHSTD, which is a superset of the subsets of HASHS1, HASHNAV and HASHFONT. The production of hashes from data is demonstrated in the sample script. AIEM HASHES can be any length, usually set by an administrator in the variable MAXHASH. These examples hashes composed of 8 digits is assumed, so HASHS1|HASHNAV|HASHFONT would be 24 digits.

As each test completes, an event timer time stamp entry is created, labeled 802. The time stamp log process continues for every page load, every test completion and connection event until a master Diffie-Hellman shared key, TmA2B|B2A is created in 809. In some embodiments of the present invention, the timer log may continue thereafter, recording every event, even recording a time-stamp for each keystroke to collect additional bio-metric data, perhaps labeling a circle "K" for "Keystrokes" (or some other device, bio-metric or other test defined by a practitioner for either the 801 "Standard" tests or 803 Dynamic, "Un-Standard" test series.

While the Standard Tests and creation of hSTD and hSTT often take less than 10 milliseconds, the Dynamic "Un-Standard" test suite surrounding the box labeled 803 begin after additional test scripts have loaded. The 803 tests typically vary every session, though some tests such as the CPU capabilities generally produce results within a narrow range of values. In this embodiment of the present invention, "S2" represents the second screen test, which records screen parameters that may be vary from session to session, such as the actual browser width and height at the time of the login; i.e. is the user viewing with a full screen or partial browser screen and if so, what is the height and width? "Q" represents the Quality Control script test which measures over 30 characteristics of each script loaded, as described in the example below; "C" represents the Socket Connection script test; "M" represents the Mouse Movement and click test; T represents the aforementioned Time-Stamp test data streaming from 802, where the most recent Time Stamp Hash, hTm, is a subset of the Dynamic USTD Test suite. "2fA" represents the optional Two-Factor Authentication test; i.e. an easily memorized series of digits which may be typed in or are derived from a secondary device or token or other means, and was generated in a separate session, perhaps even at a completely different URL or on a different device altogether prior to this login attempt.

The test circles labeled "P", "A" and "B" represent the Prime Number Generator, Alice Secret keys and Alice-Gift-To-Bob respectively and because these are large numbers and require BigMath libraries, no matter if the language is JavaScript, Perl, C or another language, these tests are greatly affected by the CPU MATH LOOP test shown in the circle labeled "L". As shown at the junction "J", the Tm, C and K test data form Merkle Trees and continue to change their respective hash figures in HASHUSTD, which affects all processes above 805 through 812 inclusive. In some cases, such as Prime Number Generation in "P" of 803, HASHUSTD serves as a "Feedback" Loop"; eg. the first Prime is generated based on the current value in Tm and HASHUSTD, and thereafter a hash derived from the Primes is concatenated to the current value of" Tm and HASHUSTD and a hash of the result starts the next Prime search. Data flowing through junction J also affects processes in 805, where HASHUSTD is frozen at 805, with no horizontal I/O line on right from any processes affecting HASHUSTD at 808 while the server is attempting to decrypt e(TmA2B|hUSTD). HASHUSTD remains locked until the shared secret TmA2B|B2A master Diffie-Hellman key is produced at 809 when it forms a portion of the encrypted package e(TmA2|B|HASHUSTD) (shown as hUSTD at 805). HASHUSTD is also used to determine the random character position at 805 and optionally, at 807. with 805 producing a prompt for a single character from the User ID at a specific position, and from the next one-time password, represented by the portion of the key k(UP1|UPPOS|hSTD) at 805. HASHUSTD (shown in the figure at various locations as hUSTD and hUSTD-M and hU), also plays a roll in every step thereafter, serving to salt the character position selection process at 807 when the optional authentication of UP4|POS4 is utilized for additional partial password requests shown as hU4 at 807; or where HASHUSTD is part of a key, shown as "hU" at 807 and 808, and as shown at 810, where HASHUSTD-M, the hash of the rapidly mutating Dynamic "Un-Standard Tests" tests, are fed by socket connection data and related hash hCn processes from 804, and a hash of each key used for encryption in the 806 processes. In one embodiment of the present invention, the constant background generation of prime numbers even after the large shared master key TmA2B|B2A is acquired and OTPDH is available in 812, HASHUSTD continues to rapidly mutate from 804 (connection) and 806 (key hash) data, altering prime number generation and the creation of the subset OTPDH from master key TmA2B|B2A in another feedback loop based on growing nodes in the Merkle Tree. Therefore in one embodiment of the present invention HASHUSTD may cease mutating once TmA2B|B2A has been generated, or may continue to mutate depending on the application, design and capabilities of a practitioner, as well as the device characteristics and unforeseen factors in the present; i.e. emerging technology added to a device such as the recent addition of credit-card swipe devices to cell phones, and prior to that, the inclusion of cameras and wifi antennas and their associated MAC IDs present on many electronic devices today. The various hashes from various tests are "Joined at J" and used to "salt, alter or modify" processes and create an ongoing random number generator which are utilized for example; to create the Prime numbers at P, which provide the foundation for the series of calculations leading to the creation of the Alice Secrets at "A" and Alice-Gift-To-Bob at "B."

This cross-test effect, a common characteristic of the most basic Merkle Tree methodology, is especially true of the test results in the 803 circle labeled "L"; the CPU MATH LOOP TEST, which is perhaps the most influential test of all during the authentication phase and the session encryption function thereafter. The CPU Math Loop Test affects the generation of prime numbers in that the size of the prime numbers and the number of prime numbers generated is proportional to the capabilities of the math processor in each device. The CPU Math Loop Test repeatedly measures how many calculations can be performed in a 100 millisecond time period, as well as how often and at what frequency the CPU pauses to swap concurrent processes when multi-tasking. Results of this test reflect the user device CPU's capability and are affected by the various installed software packages which may be running in background and demanding CPU time. Test "L" therefore ultimately determines the size and number of generated primes, labeled "P", that any device is capable of creating in a reasonable period of time under its current load, and this affects the Alice Secrets, labeled "A", and Alice-Gift-To-Bob packages, labeled "B", and therefore, the A2B and B2A packages, as well as the final Diffie-Hellman calculations and the resulting shared keys TmA2B|B2A, along with the size of keys used for each encryption using the key OTPDH which the Authorized Parties utilize to perform full session encryption at 812.

In addition to being CPU intensive, the test suite shown at 803 produces a long, concatenated series of hashes; a multi-component HASHUSTD, or "hUSTD", reduced further to a single hash, HASHUSTT or hUSTT first appearing above 803. While these tests are proceeding; an event which may require 10, 20, 30 or even 60 seconds depending on the "CONVENIENT WAIT TIME" setting of the server administrator; the connection test, labeled "C" is proceeding concurrently, creating its own growing body of test results, hashes and a subsequent Merkle Tree, shown at 804, and feeding its results to HASHUSTD (hUSTD) through the J junction. Since the tests at 802, 804 and 806 run continuously, their respective hashes, which are components of hUSTD thereby change hUSTD at a rapid and random pace up to the point the user has typed their subset characters (one or more) of their User ID and one or more character subset(s) of their next one-time password, and all tests have finished; allowing the creation of HASHSTT|e(TmA2B|HASHUSTD) or hSTT|e(TmA2B|hUSTD) at 805.

Upon completion of the Prime Number Generator test, "P", the Alice Secrets are created, "A", leading to the Alice-Gift-To-Bob calculations, "B". At this point the client browser waits for the user to finish UP1; their one (or more) characters of their User ID and one (or more) characters of their Next One-Time Password, but in no case, types their full User ID or full Password until receiving e(TmB2A) in 808, where they complete their next one-time password. Selecting the position of these subset ID and Password characters, shown as UPPOS at 805, is also a result of the hUSTT hash of 803; e.g. if HASHUSTD equals 85321234, the prompt may be to "Enter the 8th character of your user ID and 5th character of your password.", based on 85; the first two digits of HASHUSTD in this example. At 805, UP1 and UPPOS are concatenated to HASHSTD (hSTD) to create the key k(UP1|UPPOS|HASHSTD) (shown in 805 as hSTD), which is used to encrypt the Alice-Gift-To-Bob and Dynamic Un-Standard Tests, creating e(TmA2B|hUSTD).

While the key k(UP1|UPPOS|HASHSTD) may be weak; perhaps only 30-50 alpha-numeric characters long if each hash is set to be 8 digits, the data it conceals is merely the ad hoc Diffie-Hellman Alice-Gift-To-Bob, which varies widely from session to session. Furthermore it should be noted that in the standard, commonly used Diffie-Hellman exchange, this same data is commonly sent as plain-text anyway, with the advantage of the AIEM/DAAAD method being this encrypted data cannot be molested, altered or easily replaced in a real-time Spoiler Attack. The other encrypted component, hUSTD at 805 is also a large one-way hash from the ad hoc series of 802, 803 and 804 tests that are simply derived from parameters a man-in-the-middle listener might acquire anyway; i.e. packet round-trip times, and page load sizes of the QC and Connection tests; even Mouse movements and clicks and browser inner window height and width. The objective of the AIEM/DAAAD system is not to encrypt this package to protect it for a prolonged period, rather simply ensure it can reach the server unmolested and cannot be brute-force attacked or altered in real-time without detecting a noticeable delay or warping the final results and thereby preventing the Second Authenticated Party from determining who the Client/User is at step 808; such an event either terminating the login attempt instantly or forcing a Challenge Question series of prompt(s). Few computers, not even super-computer cracking arrays, can break a 30-50 alpha-numeric character or numeric key in real-time without creating a substantial, noticeable transmission delay; a task made even harder once USTD is affected by the Merkle Tree and associated hashes are derived from each and every key used for encryption, when the Merkle Branch process at 806 begins. A rough calculation indicates a mere 50 character alpha-numeric password with a key space of 7.78×10$^{98}$ is estimated to require 2.47 thousand trillion trillion trillion trillion trillion trillion centuries assuming one hundred trillion guesses per second in an offline super-computer cracking array. Cracking this in real-time at a speed faster than processes 802, 804 or 806 are mutating USTD in a matter of a few milliseconds, thereby changing HASHUSTD (hUST); altogether a virtually impossible task now, and highly unlikely to ever become possible in the lifetime of a user no matter what sort of computer technology or algorithms may be developed in that span of time. Lengthening the hashes from 8 to 16 would create a much more daunting task, yet utilizing these hashes to select a subset of TmA2B|B2A to create a new OTPHD for each and every encryption is trivial for the Authorized Parties who have complete knowledge of the completed large master Diffie-Hellman key, TmA2B|B2A, as well as the connection data at 804 and therefore, can share encrypted values of each emerging Tm node, and thereby know what OTPDH to utilize from TmA2B|B2A; with these parameters, authorized parties constantly share the rapidly changing hash of OTPDH, reflected in the "K" (for Key) branch of the Merkle Tree shown at 806.

Upon typing the specific single character user ID and a specific character from their password, the client is ready to create the package HASHSTT|e(TmA2B|HASHUSTD), shown as hSTT|e(TMA2B|hUSTD) at 805. The key utilized to encrypt e(TmA2B|HASHUSTD) is k(UP1|UPPOS|HASHSTD) or optionally, k(UP1|UPPOS|HASHSTD|moreHASHES) if the socket connection hashes are included, since the server has these, or optionally k(UP1|UPPOS|HASHSTD|HASH2FA) if two-factor authentication is being used. hSTT|e(TMA2B|hUSTD) is then sent to the server at 805. In one embodiment of the present invention where a stronger authentication is desired, the server may respond as shown in 807, requesting additional characters from the next one-time password; i.e. "Enter 4 characters of your next password starting at position 2." If completed in a short time, the user has confirmed they are the correct person receiving and able to answer the correct prompts from the server, yet the full password has still yet to be revealed. Once authentication is complete, the server begins the task of attempting to identify the user starting with only HASHSTT, shown as hSTT at 805. The sequence for developing Candidates is as follows.

The server only has the plain-text hSTT and the IP address of the User, as well as a few environmental parameters, such as the user agent of the browser that performed the post. The server takes the IP address of the user, e.g. 123.456.789.555, and uses the first 2 segments; e.g. 123456, called "IP2", which is generally the same for a specific ISP, and concatenates IP2 to the hSTT hash; e.g. 57578888 added to 123456 would yield 12345657578888, which the server uses as the first filename; e.g. 12345657578888.usr. If this file does not exist, the user, valid or not, is accessing the system on an unknown/irregular IP address and is immediately sent to the Registration or Problem Resolution screen to either sign up for a new account or utilize a Challenge Question/Answer session to add the new IP address range to their account. If the file does exist, the server scans the file which is made of HASHSTD which can be reduced to recreate HASHSTT, paired with hashes of User IDs, "HASHUID."

The server concatenates each HASHUID and HASHSTT to create a second filename; e.g. 7788990055112233.uid. If the file does not exist, again the login is flagged as irregular. If it exists, the server opens the file which has a list of User ID's which can recreate HASHUID, paired with IP2 entries and the next one-time-password; three segments of data on each line, greatly reducing the Server's list of possible Candidates and having only opened 2 files thus far and read perhaps 10,000 lines at most; a trivial task for most servers. The data is NOT stored in plain-text, rather it is encrypted by the k(HASHSTD|HASHUID|IP2) entry; i.e. 12345678123456778123456, estimated to require 3.53 years per user assuming one hundred trillion guesses per second in a massive offline attack if the server data was stolen, and optionally, if the HASH2FA two-factor authentication is being utilized, 3.5 million centuries.

If the HASH2FA is present (two-factor authentication is being used), the server creates a third file name, concatenating HASHSTT, HASHUID and IP2; e.g. 1234123433333333123456.2fa. If the file does not exist the login is irregular. If it exists the server reads the file for a matching HASH2FA, merely noting that a user with a matching device test, HASHSTD, and hash of their user ID, HASHUID and IP address range, IP2, has provided an accurate, valid HASH2FA. The password tests must still proceed, but without this confirmation, even a user with a valid password would be flagged as irregular.

For a server in possession of HASHSTD, HASHUID, IP2, and optionally, HASH2FA or HASHUP|UPPOS|HASHSTT, decrypting each line is trivial. Upon decrypting a Candidate's record and acquiring the each one-time password, the server can then test each Candidate's key with k(UP1|UPPOS|HASHSTD), or optionally, k(UP1|UPPOS|HASHSTD|HASH2FA), and attempt to decrypt the package hSTT|e(TMA2B|hUSTD) which was sent by the client. A successful decryption would mean the server has found the correct device test at the correct IP address, with a matching user ID (based on one specific character at a specific position), and 1 or 2 password characters, also at a specific position. Furthermore, the server now has decrypted HASHUSTD, which contains among other items, a CPU Math Loop Test, labeled "L", which should be close to a known historical value for this specific user. The server creates a third file name with HASHSTD|HASHUID|IP2; e.g. 123456781234567812345.cpu, which should yield a User with a device that has a history of similar CPU capabilities. This is enough information to test the server's theory that it has narrowed down the list of Candidates to a user who appears to have the correct next one-time password. To verify this, after completing the "BOB" calculations by using the A2B package received to create the B2A package to send, the server uses the full next one-time password, FNOTP, and encrypts the outgoing package with the key, k(UP1|UPPOS|HASHSTD|HASHUSTD|HASHFNOTP|HASH2FA), and returns the encrypted package e(TmB2A) to the Client, as shown at 808.

If the user can complete their full next one-time password in a reasonable period of time allowing the client to recreate the key k(UP1|UPPOS|HASHSTD|HASHUSTD|HASHFNOTP|HASH2FA), the client can decrypt e(TmB2A) and thereafter, complete the Diffie-Hellman handshake and utilize the large secret shared key TmA2B|B2A, as well as create the smaller 2 kB key OTPDH actually used for encryption. If the user is unable to provide the correct full password, FNOTP in a reasonable period, the login is flagged as irregular.

When the server replies with an encrypted packet, which includes the full Diffie-Hellman shared keys, B2A, and the key includes the full one-time next password, which has never been transmitted in this session, and the user types this full password in at 740 and replies, any man-in-the-middle oracle attack is forced to calculate all keys utilized thus far, plus the full one-time next password in order to hijack a session which is already fully encrypted by a key of over 2,000 bytes. While computer capacity may improve in the future to perform such a brute-force attack, the AIEM KEY automatically grows longer and stronger as CPU power improves. Any man-in-the-middle listening attack who garners all information provided to break the session later, is faced with key lengths of 2,000 or larger, as well as at best, decrypting a one-time use next password which can never be verified as correct again.

II. Attack Detection

Incorrect username characters, passwords, or responses to challenge questions are one way that embodiments of the present invention detect attempts by third parties to maliciously gain access to a user's personal and private information; as discussed above, if any of the aforementioned information does not match expected values, the server 112 may require further login attempts, additional challenge questions, and/or out-of-band authentication (via, for example, phone or email). In one embodiment, a user becomes "trained" to never enter their full username or non-one-time-use passwords and, if a website (or other service) prompts the user for such information, the user may automatically understand that the site is malicious and refuse to enter said full username and password.

In another embodiment, other attacks (such as man-in-the-middle attacks) are detected even if no incorrect user-input data is given. The server 112 and/or client 102 may determine a typical round-trip transmission time for packets passed therebetween; if a packet or number of packets experiences a greater-than-usual transmission time, the server 112 and/or client 102 may determine that the transmission delay is caused by an active man-in-the-middle attacker attempting to de-crypt communications therebetween. The threshold for an increase in transmission delay indicative of such an attacker may be, for example, a value 10%, 25%, or 50% greater than average or outside of a standard deviation. The threshold may further take into account delays caused by non-malicious network traffic, the time of day, network outages, server loads, or re-routes, line corrosion, or other such factors. An example of a reasonable round-trip time over a common residential grade WiFi network located near San Francisco and a Server located in Phoenix Ariz. is 200 milliseconds, yet a similar test from a user in the rural midwest utilizing a satellite dish might result in a round-trip time of a full second or more, while a user in a large metropolitan area, on a dial-up copper-based connection could experience a delay of several seconds. The AIEM/DAAAD system can tolerate such delays, and differentiate between a transmission problem and a man-in-the-middle attack, even when a round-trip delay due to a severe factor requires 3 to 5 seconds or more, since these times are trivial compared to a man-in-the-middle induced delay caused by the attacker attempting to use a real-time brute-force attack against a key such as k(UP1|UPPOS|HASHSTD|MoreHASHES|HASH2FA), or even more difficult, k(UP1|UPPOS|HASHSTD|MoreHASHES|HASHFNOTP|HASHUSTDHASH2FA), and even more difficult still, the rapidly changing key, k(OTPDH), in a keyspace of 2,000 or more. Such an attack in real-time, even for a super-computer array, is considered impossible with current technology, and even if it were possible, an attack without triggering a noticeable delay difficult, if not impossible.

III. Artificial-Intelligence Encryption Model

In one embodiment, the client 102 and/or server 112 include an artificial intelligence system for varying the level of security and encryption therebetween based on a risk of prior or anticipated malicious attacks, a type of communication, and/or processing ability of the client 102 and/or the server 112. For example, one of the applications or application components downloaded to the client 102 may include a tool for measuring the processing power of the client 102 by, for example, directly querying the hardware or software of the client 102 for system information, running benchmark programs on the client 102, creating or multiplying prime numbers on the client 102, or any other such means. An acceptable login-process time may be defined by the server 112, such as ten seconds, thirty seconds, or sixty seconds; a encryption parameter for use with communications between the client 102 and server 112, such as the number of bits to be used in the encryption, may be selected such that the client 102 performs any computations required during the login process in the acceptable login-process time. In one embodiment, if the processing capabilities of the client 102 are found to be insufficient to generate a key having an acceptable level of security, the user of the client 102 may be prompted to answer one or more challenge questions (in addition to entering some characters of their username and their password).

In another embodiment, a type of the communications between the client 102 and the server 112 may be used to determine values of encryption parameters (e.g., number of bits). Communications that do not include personal or financial information, for example, may be permitted to use less-secure, but faster cyphers, while other communications using more-sensitive information require more secure cyphers, time to encrypt data and higher CPU loads. In another embodiment, degrees of importance of types of communications are similarly used to determine the level of encryption; for example, financial transactions of an amount below a threshold (e.g., $50 or $100) may be permitted to use less-secure, faster protocols, smaller keys more easily utilized on inexpensive devices, while transactions above a threshold amount are not so allowed, and may require a device with a higher CPU clock, more RAM or other characteristics which allow the device to create and utilize longer keys and more extensive encryption. This "artificial intelligence" parameter; the length of the key and number of times a given encryption is allowed to run, is calculated from several tests, starting with the CPU test which performs a rapid series of math calculations, counting loops performed in 100 milliseconds, then repeatedly retesting for a period of a few seconds to acquire a high, low and average number of CPU calculation per 100 milliseconds, as well as a "CPU Pulse", which occurs with nearly every multi-tasking device, as the CPU's registers are loaded with pending tasks, such as a background Windows System process that is waiting for CPU time while the calculations take place, and acquires the attention of the CPU every 500 milliseconds. When several of these background tasks are present, as with nearly all computers, the CPU develops a rhythmic pattern that is easily recorded and serves as another "Fingerprint" of the device and installed software running in background. Once the CPU characteristics are established, the ad hoc creation of prime numbers and length of keys is automatically adjusted. For example, an Android Bionic may produce Prime Numbers that are only 70% as long as an Intel I-5 laptop, and the resulting key length of k(OTPDH), used for each encryption may only be 2,000-2,200 for the Android, and 3,000 for a faster CPU installed in a laptop running Windows, and 4,000-8,000 for the same CPU in a desktop running a Linux operating system. These performance characteristics, when combined with other test results, provides the Second party in an Authenticated Exchange, a test result which can be referenced with previous log in attempts, and even other user CPU performance histories; i.e. two users both running I-5 laptops with fairly high CPU test results and similar operating systems should generally produce keys and test results of similar size or a man-in-the-middle attacker may be "emulating" a device and attempting to produce data which is likely to be detected as "abnormal". If abnormalities in the CPU tests are not detected, the CPU of an attacker, often utilizing a high-powered CPU or GPU array, will proceed to create large Primes and utilize a large number of loops during the encryption fold and mix processes, as well as a larger mime key array; again, providing an abnormal combination of characteristics when compared to the user's past performance or the performance of similar devices. Any successful attack emulator will need to obtain a large list of performance characteristics of many devices and combinations with operating systems and installed software, all of which change on a regular and frequent basis as publishers release new versions and CPU's continue to improve at a relatively fast pace compared to the time required to acquire all of the data required by such an emulator attempting to meet the challenge of emulating a large population of diverse devices.

The quality or reliability of the network connection between the client 102 and the server 112 may also be analyzed and used to vary the strength of the security established between the client 102 and the server 112. For example, if the transmission times between the client 102 and the server 112 are found to vary within a range due to non-malicious network activity or problems (e.g., high-traffic times, bad Wi-Fi connections, or network outages), the AIEM module may increase the security strength (i.e., number of bits in a key) such that a man-in-the-middle attacker would need to spend an amount of time appreciably and detectably greater than the transmission variation inherent in the network link. For example, if normal transmission times vary between 250 ms and 500 ms, the security strength may be increased such that the man-in-the-middle would have to spend 750 ms cracking the encryption.

If one or more attacks have been detected in a predetermined window of time (e.g., within the last hour, day, or week) during previous or current login attempts, the degree of encryption may similarly be increased. For example, if a man-in-the-middle attacker has been detected in the past regarding the current user and/or client devices associated with the user, the server 112 may require a greater degree of encryption security. Similarly, the client 102 may perform a more rigorous "stress test" of the server, wherein the packages exchanged between the client and the server may be increased in complexity, number, and/or duration.

IV. Key Strengthening

Even after creating the 2,000 digit key, k(OTPDH), which grows as computer performance improves, these digits are not used for encrypting transmissions. The digits serve as the basis and sequence for creating a large array of mime characters; a Moving Target, where every character receives a new cypher key, as with the cryptographic mechanism first developed by Thomas Jefferson, "The Jefferson Disks", and various mechanical cypher wheels. Using the example, "Cat found a Mouse", and a key of "abc_1234", along with the mime character set, ABCDEFGHIJKLMNOPQRSTU-VWXYZabcdefghijklmnopqrstuvwxyz0123456789+/, as well as hashes from test results, the key might create an array beginning with the entries (JKLMNOPQRSTUVWXYZab-cdefghijklmnABCDEFGHIopqrstuvwxyz0123456789+/), (ABCDEFGHIopqrstuvwxyz0123456789+/ijklmnJKLM-NOPQRSTUVWXYZabcdefgh), (tuvwxyz0123456789ABCDEFGHIopqrs+/ijklmnJKLM-NOPcdefghQRSTUVWXYZab), where the letter Capital "C" of Cat, with "C" being the third letter of the unscrambled MIME set, is applied to the third letter of the first line of the array, (JKLMNOPQRSTUVWXYZabcdef-ghijklmnABCDEFGHIopqrstuvwxyz0123456789+/), yielding the letter L, and the lower case "a" of Cat being the 27th letter of an unscrambled mime set, when applied to the 27th letter of the second line of the array (ABCDEFGHIopqrstu-vwxyz0123456789+/ijklmnJKLMNOPQRSTUVWXYZab-cdefgh), produces a 5, and the lower case "t" of Cat, being the 46th character of the unscrambled mime set, and applied to the third line of the array, (tuvwxyz0123456789ABCDEFGHIopqrs+/ijklmnJKLM-NOPcdefghQRSTUVWXYZab), produces a capital "P", so "Cat" becomes "a5P", and so on. Utilizing this technique, the search space created by an array of scrambled mime lines reaches well over 1.37×1010111.

V. Blocking Data

Once generated, the AIEM key and encryption processing can run as either a String or Block cypher; the example shows a block cypher. Blocks of data vary in length from session to session, based on the length of the original string; i.e. a 500 character phrase might have 10 blocks of 50 characters each, while a 10,000 byte chunk of data might be broken into 15 650 byte blocks, ending with a 250 byte block for the remaining characters. After the key strengthening ("Moving Targets") process is completed, by default, the AIEM system breaks the string data into blocks and begins encrypting each block as a separate entity.

VI. Blending Data, Splitting and Rejoining Strings and Blocks, and Re-Ordering Blocks Once data is parsed into blocks and encryption begins, after each block is encrypted the blocks are divided into multiple segments of varying length, then the segments are reassembled in a different sequence; called blending. After all blocks have been thus encrypted, the sequence of all the blocks is also reordered so the final result—the fully encrypted string, generally has no character, encrypted or otherwise, in either a left-to-right or top-to-bottom position as the original string. Expanding our Cat example above to become the phrase "A Cat found a Mouse and Cow jumped over the house. A Dog chews on the log and all the white birds flew around moon, stars and sun.", after the mime keys are created, depending on hashes and/or salts, such as a time stamp, the data might be blocked into:

A Cat found a
Mouse and Cow
jumped over t
he house. A D
og chews on t
he log and al
l the white b
irds flew aro
and moon, sta
rs and sun.

Assuming each block is encrypted to create:
Cz123987asd5f
anfkgAfITUDfa
asdkjgzjdfjfa
AHBVHgfhght12
sdkfhjth41239
acehfhgh52345
khgkrJFJ34423
sgjghhboightD
gjboth9503a3D
asfjg9604ab The actual process folds text in each blocks, scrambling data, which might have created:
87asd5fCz1239
UDfaanfkgAfIT
asdfjfakjgzjd
AHghtBVHgfh12
sth41239dkfhj
ace345hfhgh52
gkrJFJkh34423
sgtDjghhboigh
gj03a3Dboth95
asf604abjg9

And the blocks are rearranged, which may have created:
gkrJFJkh34423
sgtDjghhboigh
UDfaanfkgAfIT
gj03a3Dboth95
asdfjfakjgzjd
sth41239dkfhj
AHghtBVHgfh12
87asd5fCz1239
ace345hfhgh52
asf604abjg9

Actual line folding, scramble mixing repeats multiple times, which would increase before and after differences in these simplified examples. This example also shows the MIME TEXT as the same length as the ORIGINAL TEXT; whereas mime encoding typically lengthens the original text, so encrypted data encoded to Base 64 MIME text is usually 137% longer than the original text.

After all key arrays have been generated and all data thus encrypted, flipped, blended and mixed, a series of digits are produced; the "Tail", which consists of the CPU Average from the CPU Test, Block Length, Fold Time, Last Mime Key Character Position, Loop Limit and Last Block Pointer. To decrypt a package the AIEM process requires both the original password or key used to create the array of scrambled mime strings, and all of the factors that determine how many times through the key array the encryption process ran, where each process ended and what the last character position of the encryption process was. Mathematically, AIEM decryption runs in the reverse order of encryption and without a valid ending point and position of all pointers, salts and keys, decryption by simply owning the original key becomes another large brute force effort, especially lacking the block size which varies from encryption to encryption. This characteristic of the AIEM system allows for multiple parties to hold a portion of the master OTPDH key, ending states and salts contained in the "Tail"; a by-product of each encryption process.

Figure 9:
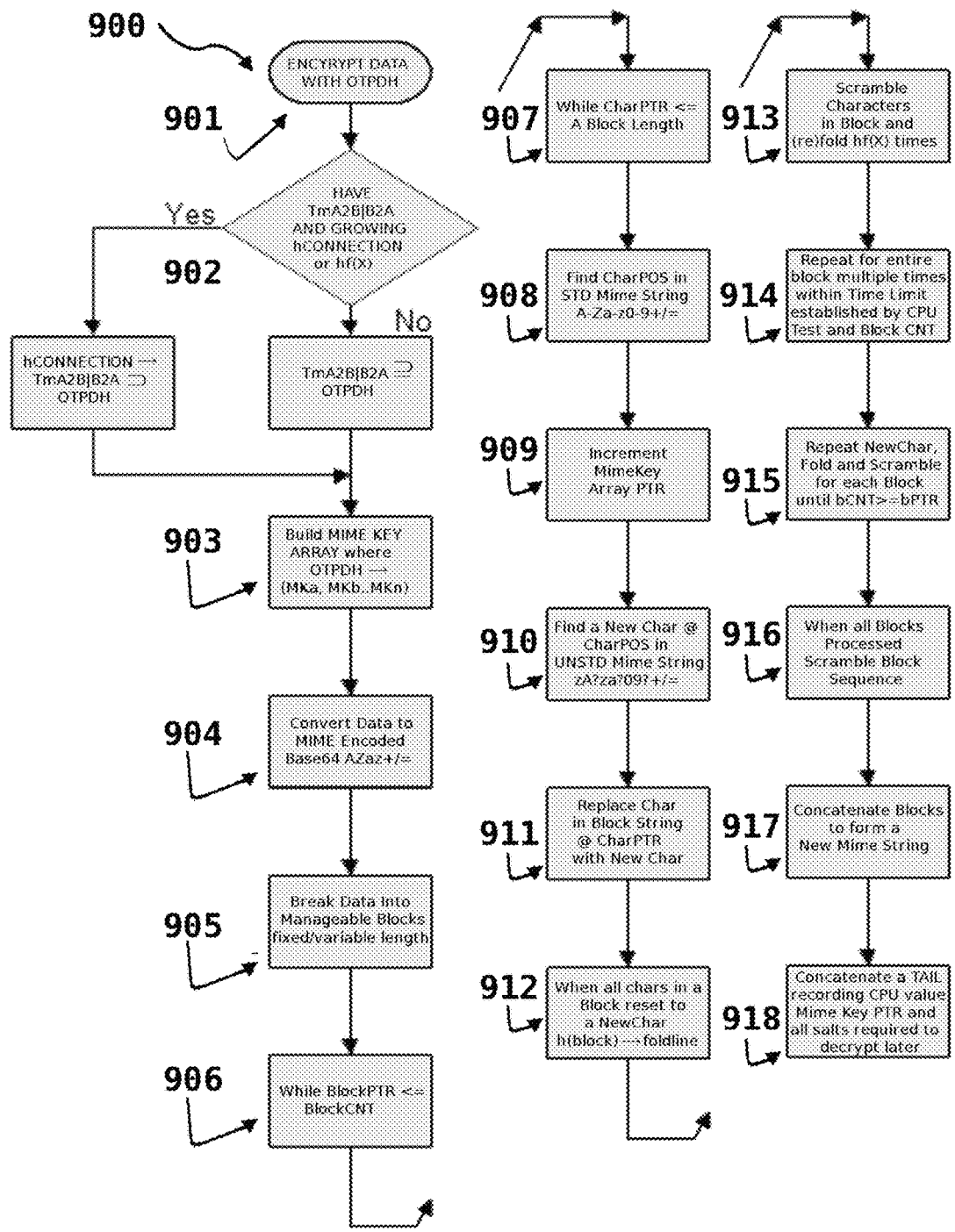
FIG. 9 illustrates a method of encryption in accordance with embodiments of the present invention.

FIG. 9 illustrates one embodiment of the present invention after TmA2B|B2A is established during the login described in FIG. 8. In FIG. 9, at 901, Session Data is to be encrypted by OTPDH, a subset of TmA2B|B2A. At 902, the content of OTPDH is either a subset of TmA2B|B2A based on a hash, such as the connection hash described at 802 of FIG. 8, or another function or hash, hf(X), depending on the design, device, fingerprint and salt parameters available. If no hash is provided, as often the case when encrypting a file prior to establishing any connection or secure login, it is assumed OTPDH is a set equivalent to TmA2B|B2A, as with a Diffie-Hellman shared, secret key, or other calculation or password as determined by the User when a password is transmitted to the decrypting party by some other means; e.g. out-of-band transmission. At 903, OTPDH is applied to repeatedly rearrange the standard Base 64 MIME character set, A-Z, a-z, 0-9, +/=, to create the multi-dimensional array that serves as the actual encryption key. Each MIME line is "scrambled" and checked to avoid duplicate array entries, and a larger key is created often 50-100-200 times the size of the original or more depending on CPU capability, using each line in the array made of a full MIME character set now in a new, different, random order according to the original OTPDH password. At 904, the original data is encoded to a standard Base 64 MIME character set, and at 905, the entire original string of data, whether text or binary, is blocked into manageable sizes of fixed or variable length; often with the last block shorter than the preceding blocks or padded to match a fixed block length. From 906 through 914, the entire encryption cycle repeats based on CPU capability, convenient time limits set by the administrator; e.g. 2 seconds per encryption, as well as number of blocks and time to process each block. At 907 processing begins on a single block; a string of unencrypted data, where a single character is selected at position CharPTR from the unencrypted block string. At 908 each single character is located with its relative position in the standard MIME alphabet; e.g. character C can be found at position 3 and character 2 can be found at position 55, yielding CharPOS. At 909 the MIME Array Pointer is incremented so a new scrambled MIME alphabet will serve as the superset of the encryption key for this specific character. At 910 the character at CharPOS in the scrambled MIME alphabet is selected, i.e. the letter "y" and replaces the unencrypted letter in the block string at 911. At 912 the replacing continues for the entire line, and then the line is folded as determined by a hash; e.g. hf(X), where a substring originally consisting of the left side of the block string is removed and added onto the end of a substring that originally consisted of the right side of the block string. At 913 the characters are scrambled; e.g. where the 3rd character is moved to the 45th position, the 45th character moved to the 17th position and at 914 encryption, folding and flipping repeats one or more times based on CPU capability, convenient times, block count and time to process each block. At 915 the encryption, fold and scramble process repeats for each block string. At 916 all blocks have been processed and now entire blocks are rearranged; e.g. block 1 replacing the 7th block, which replaces the 3rd block, which replaces the 15th block. At 917, the block strings are concatenated to form a single long, final Base 64 MIME encoded string ready for transmission (ENCREADY). At 918, the final TAIL may be concatenated to ENCREADY or sent in a separate transmission. The TAIL consists of the CPU value used, which determined several loop counts and limits, as well as the last characters processed, the last position in the MIME KEY Array pointer, the last block and character positions processed, the last fold or scramble settings and other settings required to reverse the encryption sequence. Decrypting the finished string requires both the original OTPDH key to rebuild the MIKE KEY Array, as well as the TAIL data since the AIEM Encryption must run backwards from the final state of the encryption. Therefore, in some embodiments of the present invention, the TAIL may serve to create a secure package that tells nothing about the encrypted string, and may be shared among multiple entities whereby the password by itself is insufficient to decrypt the final message and each entity holds a portion of the password or TAIL, which must be concatenated and also applied for successful decryption. In some embodiments of the present invention the TAIL is simply concatenated to the end of, and available with, the encrypted string, and therefore only the shared password is required to decrypt the string.

In any case, upon receipt of encrypted data, decryption requires either stripping off the TAIL or obtaining it in a separate transmission, as well as utilizing the OTPDH to rebuild the MIME KEY Array and applying the CPU Capability Test and other salts and "recorded last position" data to set a LAST STATE before decryption may proceed. Thereafter, the block size is determined and the encrypted string is blocked, according to 905, then the block sequence is unscrambled, reversing 916, then each block string is unfolded, unscrambled and decrypted multiple times, reversing 915 through 907, one or more times, with the decrypted string replacing the characters in the block string. The reverse process continuing until all blocks have been decrypted at 906.

Certain embodiments of the present invention were described above. The AIEM process balances between fast and convenient versus slow, laborious, strong and CPU intensive encryption. The AIEM system with its large keys, key strengthening mechanism, and complex mixing schedule, produces a strength of encryption intended to outlive the user, and which grows stronger automatically as CPU speeds improve by increasing key sizes and number of repetitions of folding and scrambling. It is expressly noted the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

A QC module monitoring over 30 script characteristics may count and detect all functions, base 64 calls, references to cookies, XML, eval and other dangerous JavaScript tags. Combined with byte counts of every page and script, and a hash of every page and script, no byte can be changed in any of over 50,000 bytes of code without triggering an immediate red flag event.

Another feature is the orphan file, where the server stores encrypted packets that it cannot decrypt because it lacks a key and the user is able to send encrypted packets to the server without the server having possession of any key. These allow the user to by-pass man-in-the-middle attacks, ensuring the server receives packets unmolested, or force an attacker to perform brute-force calculations, triggering an easily detected delay. Once the server has received the packet and replied with a confirming hash, the user can follow up with the key as another encrypted packet, also stored in the orphan file. This process of sending orphaned encryptions continues until the user and server have established a fully encrypted Diffie-Hellman shared key, at which point the user can forward a packet of passwords the server can use to decrypt the orphans. Upon decrypting these packets, sent earlier during the QC and Fingerprinting process, the server can be sure the hashes and test results were valid, that the man-in-the-middle had no access to them, either to modify contents or emulate the client, and had no time to decipher the contents, either in real-time or through a listening attack for decryption later.

VII. Example

Assume that two people wish to exchange a message securely, traditionally named Alice and Bob. Alice initiates the message by sending Bob a key, which will be the mode for encrypting the message data. This is a random sequence of bits, sent using a certain type of scheme, which can see two different initial values represent one particular binary value (0 or 1).

Let us assume that this key is based on digits, with each of digit representing a single bit of data (either a 0 or 1). However, in addition to their value, some of these digits are affected by other concurrent factors, such as CPU load or screen size, some of which are also mutating and changing, and therefore are oscillating (vibrating) in a certain manner. These oscillations can occur in any 360-degree range across any conceivable axis, but for the purpose of simplicity (at least as far as it is possible to simplify things in quantum cryptography), assume their oscillations can be grouped into 108 particular states, represented by a hash of 8 decimal digits, The value of this hash of the vibration is known as polarization.

Now, let us introduce a polarizer into the equation. A polarizer is simply a filter that permits certain digits to pass through with the same oscillation as before and lets others pass through in a changed state of oscillation (it can also block some digits completely, but let's ignore that property for this exercise). Alice has a polarizer that can transmit the hash digits from a given test, for example a screen test finding a PC in full screen mode with a height of 800 and width of 1024 might produce an 8 digit hash of Ser. No. 08/001,024, whereas a party in half screen mode might have the same screen, but only produce an 8 digit hash of Ser. No. 04/000,612, and a robot running at a command prompt with no screen might produce a polarization hash of 00000000, even though the actual screen of the device was 900 by 1460, and when combined with another parameter, such as a new hash created from two hashes, a Merkle Tree is formed, which could produce a hash of 07751012 by averaging 08001024 (a screen test) and 07501000 (i.e. a browser navigator test), so that the value of each hash can affect the value of subsequent calculations and continue to do so for a prolonged period of time.

Alice concatenates her polarization hashes to form a Fingerprint of the current state, which may change for the transmission of each test, especially when a round-trip hash is combined with another hash to form a new leaf on a Merkle Tree. In doing so, the transmission can add properties such as bytes transmitted (one hash) or round-trip time (another hash).

When receiving data, Bob (i.e. a server) must choose to look for database records relating to Alice, starting with common, static, known characteristics, such as navigator and installed fonts, narrowing down the possible Candidates based on additional test results, associated hashes and new entries in the Merkle tree, choosing the correct possible Candiates and leading to determining a subset list of only a few potential User IDs with similar characteristics. At times Bob will test the correct user and at other times he will choose the wrong one. Like Alice, he selects each polarizer and provides similar test results, such as processing time or a round-trip log, in a fairly random manner, (transmission times vary throughout a session), though most will be within a fairly stable range. So what happens with the hashes when a Man-In-The-Middle supplies data, or bogus test results?

The Heisenberg Uncertainty Principle states that we do not know exactly what will happen to each individual hash, for in the act of measuring its behavior, we alter its properties (in addition to the fact that if there are two properties of a system that we wish to measure, measuring one precludes us from quantifying the other). However, we can make a GUESS as to what happens with them as a group and can record patterns that demonstrate trends common to particular devices; i.e. the CPU speed of an Android Bionic Phone allows the device to create 12 Prime Numbers per minute and any user attempting to log in and provide a Navigator that indicates an Android phone, yet provides 20 prime numbers in a minute is a likely fraud. Suppose Bob uses test results of Alice's CPU speed and screen size and finds the CPU speed indicates a smart phone or other relatively slow device, yet the screen test indicates a high resolution device with a big screen; another indicator of faked test results. Suppose furthermore, the attacker attempts to supply a phished password obtained from Alice, yet lacks knowledge of Alice's complete ID and when asked for a random portion of her ID, is unable to perform calculations based on that letter. If a hacker does these calculations, then the hash and resulting Merkle Tree will pass through in an altered state compared to the anticipated state of an authentic login by Alice—that is, some data may match Alice's tests, and some will indicate fraud. We may not know the exact value of some tests, but can predict most likely ranges and combinations.

Bob receives some tests which appear correct and others appear incorrect; for example, Alice replies with a 10 alpha-numeric password in less time than it usually takes Alice to type each password. At this point, Alice and Bob may have established a channel of communication that is not only insecure—that is, other people can listen in, but may have alerted Bob that someone may be pretending to be Alice. Alice then proceeds to advise Bob as to which characters of her ID she has typed, but not how she determined the prompt that asked for those characters; which may have come from another hash. So she could say that the 2nd letter of the ID was requested—a letter C—and was combined with the fourth letter of the password—the digit 9—and combined with screen, CPU speed and browser test results—to create a hash 01239878. Bob then confirms if any possible combination of any Candidate that resembles Alice's tests could possibly produce the same hash, discarding all Candidates that are disqualified; i.e. those with tests that could not have possibly produced the 01239878 figure. What they have, is, on average, a range of test results that reduce the list of Candidates down to a very limited list, and thereafter, to prove a specific Candidate in Bob's database is Alice, Bob can encrypt a message with Alice's next one-time password, and send the message to Alice. If the message is simply test results already received from Alice, and an attacker decrypts the message, they gain nothing: No user ID or password information was sent. If the message is not decrypted within a reasonable period of time, Bob can assume either the real Alice forgot her password or a hacker was unable to determine what password was used and Bob can abort the login attempt, this step forming the basis for a one-time pad, the only cryptosystem that, if properly implemented, is proven to be completely random and secure.

Now, suppose an eavesdropper, Eve, who attempts to listen in, has the same device as Alice and attempts to provide similar data, but lacks some information known only by Alice, or is at a different location, and therefore has different transmission round-trip times. Bob has the advantage of speaking to Alice using Alice's one-time password to confirm if the Candidate Bob has chosen is correct. This encrypted message is useless to Eve, as a brute-force attack in real time against a password of any reasonable length is impractical, and to attempt to re-recreate all of Alice's tests, as well as provide information Eve has never seen before will form a final key that is all but useless.

Furthermore, there is another level of security inherent in quantum cryptography—that of intrusion detection. Alice and Bob would know if Eve was eavesdropping on them, and Eve's presence can become obvious because of the following.

Let's say that Alice transmits hashes 2233444, 33445566 and 44556677, each sent one second apart to Bob, but while transmitting, Eve's device was busy performing some other calculation in an attempt to serve data to both Alice and Bob in an Oracle attack, whereby Eve can only transmit data every two seconds instead of every one second. What Eve will do is change timing signals and resulting hashes, and they won't match data produced by Alice, and therefore, will change entries in the Merkle Tree. According to the Heisenberg Uncertainty Principle, of measuring it incorrectly, Eve's use of the wrong timing pulse will warp that data stream and will cause Bob to make errors even when Alice and Bob were attempting to use the correct pulse rate.

To discover Eve's nefarious doings, they must perform the above procedures, with which they will arrive at an identical key hashes—unless someone has been eavesdropping, whereupon there will be some discrepancies. They must then undertake further measures to check the validity of their key(s). It would be foolish to compare all the binary digits of the final key over the unsecured channel discussed above, and also unnecessary.

Let us assume that the final key comprises 4,000 binary digits. What needs to be done is that a subset of these digits be selected randomly by Alice and Bob, say 200 digits, in terms of both position (that is, digit sequence number 2, 34, 65, 911 etc) and digit state (0 or 1). Alice and Bob compare these—if they match, then there is virtually no chance that Eve was listening. However, if she was listening in, then her chances of being undiscovered are one in countless trillions, that is, no chance in the real world. Alice and Bob would know someone was listening in and then would not use the key—they would need to start the key exchange again over a secure channel inaccessible to Eve, even though the comparisons between Alice and Bob discussed above can still be done over an insecure channel. However, even if Alice and Bob have concluded that the their key is secure, since they have communicated 200 digits over an un-secure channel, these 200 digits should be discarded from the final key (as in discarding the preliminary tests and switching to the longer Diffie-Hellman test results and shared keys).

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

What is claimed is:

1. A method for authenticating a user of a client device at a server, the method comprising:
   prompting the user to enter a partial username by entering only a subset of username characters from a specific position in a username of the user, the subset of username characters being a portion, less than the entirety, of the username, the username being pre-stored at both the client device and the server;
   prompting the user to enter a partial password by entering only a subset of password characters from a specific position in a password or a one-time-use password, the subset of password characters being a portion, less than the entirety, of the password or one-time-use password, or one-time-use password being pre-stored at both the client device and the server;

collecting device information regarding the hardware, software, or network information of the client device and biometric information of the user;

encrypting data, using a computer microprocessor of the client device, with the subset of username characters or the subset of password characters and the collected device and biometric information;

transmitting the encrypted data from the client device to the server via a network link there between;

decrypting the data, at the server, using a server-side copy of the username, password, and collected device and biometric information.

2. The method of claim 1, further comprising prompting the user to enter a temporary two-factor authentication code.

3. The method of claim 1, further comprising:

testing a transmission time between the client device and the server for a time greater than a threshold for normal transmission times; and determining that a man-in-the-middle attack is occurring if the time is greater than the threshold.

4. The method of claim 2, wherein the encrypting further comprises increasing a strength of the encrypting in response to a determined attack.

5. The method of claim 1, wherein, during an initial login from the client device, a password is transmitted to the server using an encryption key with a length greater than or equal to 2,000 bits.

6. The method of claim 1, wherein:

the transmitting comprises sending a plurality of messages from the client to the server and receiving, in response to each message, a response from the server to the client; and at least one message sent from the client to the server includes information derived from a previously received response from the server.

7. The method of claim 1, further comprising prompting the user for an answer to a challenge question if:

the subset of characters in the username does not match a reference value; or the one-time-use password does not match a reference value.

8. The method of claim 1, further comprising prompting the user for an answer to a challenge question if a processing ability of the client device is below a threshold.

9. The method of claim 1, wherein the encrypting comprises determining a strength of encrypting based on a processing ability of the client device.

10. The method of claim 1, further comprising downloading, from the server to the client device, a software application for collecting the device information.

11. The method of claim 10, wherein the software application is selected from a pool of candidate software applications.

12. The method of claim 10, wherein the server periodically or randomly varies the software application that is downloaded to the client device.

13. A system for authenticating a user of a client device at a server, comprising:

a memory configured to store device information regarding the hardware, software, or network information of the client device or biometric information of the user;

a processor configured to execute computer instructions for:

i. prompting the user to enter a partial username by entering only a subset of username characters from a specific position in a username of the user, the subset of username characters being a portion, less than the entirety, of the username, the username being pre-stored at both the client device and the server;

ii. prompting the user to enter a partial password by entering only a subset of characters from a specific position in a password or a one-time-use password, the subset of password characters being a portion, less than the entirety, of the password or one-time-use password, the password or one-time-use password being pre-stored at both the client device and the server;

iii. collecting the device information regarding the hardware, software, or network information of the client device and the biometric information of the user;

iv. encrypting data, using a computer microprocessor of the client device, with the subset of username characters or the subset of username characters and the collected device and biometric information;

v. transmitting the encrypted data from the client device to the server via a network link therebetween;

vi. decrypting the data, at the server, using a server-side copy of the username, password, and collected device and biometric information.

14. The system of claim 13, further comprising prompting the user to enter a temporary two-factor authentication code.

15. The system of claim 13, further comprising:

testing a transmission time between the client device and the server for a time greater than a threshold for normal transmission times; and determining that a man-in-the-middle attack is occurring if the time is greater than the threshold.

16. The system of claim 15, wherein the encrypting further comprises increasing a strength of the encrypting in response to the determined attack.

17. The system of claim 13, wherein the transmitting comprises:

sending a plurality of messages from the client to the server; and receiving, in response to each message, a response from the server to the client, wherein at least one message sent from the client to the server includes information derived from a previously received response from the server.

18. The system of claim 13, further comprising prompting the user for an answer to a challenge question if:

the subset of characters in the username does not match a reference value; or the one-time-use password does not match a reference value.

19. The system of claim 13, further comprising prompting the user for an answer to a challenge question if a processing ability of the client device is below a threshold.

20. The system of claim 13, wherein the encrypting comprises determining a strength of encrypting based on a processing ability of the client device.

21. A method for authenticating a user of a client device at a server, the method comprising:

collecting partial primary credentials by entering only a subset of characters of primary credentials of the user from a specific position in the primary credential, the primary credentials including at least one of: a username, an email address, and a password, the subset of characters of primary credentials being a portion, less than the entirety, of the credentials, the credentials being pre-stored at both the client device and the server;

collecting fingerprint information comprising:
at least one of: client-related hardware information, client-related software information, and client-related network information; and
client-related biometric information;

transmitting, from the client device to the server via the network link therebetween, the collected fingerprint information;

encrypting data, using a computer microprocessor of the client device, with the subset of characters of primary credentials of the user and the collected fingerprint information;

transmitting, from the client device to the server via a network link therebetween, one of: the encrypted data or plain text of the collected subset of characters of primary credentials of the user; and upon a determination by a quantum computing model that the user is a probable authorized user, based on at least one of: the subset of characters of the primary credentials characters of the user and the fingerprint information, prompting the user to enter the entirety of the primary credentials characters of the user.

22. The method of claim 21, further comprising collecting a second factor code including at least one of: a temporary two-factor authentication code, a biometric key code, an automatically generated device fingerprint, geolocation data of the user or client, and a key derived from a prior login by the user.

23. The method of claim 21, further comprising:
measuring a transmission time between the client device and the server; and
comparing the transmission time to a threshold to determine whether a man-in-the-middle attack is occurring, wherein the threshold corresponds to at least one of:
known normal transmission times between the client device and the server, and
known roundtrip times for other users with similar devices, coordinates, or network.

24. The method of claim 22, wherein the encrypting data further comprises increasing a strength of the encrypting in response to a determined attack.

25. The method of claim 21, wherein, during an initial login from the client device, a password is transmitted to the server using an encryption key with a length greater than or equal to 2000 bits, which length is increased in correspondence with a processing ability of the client device.

26. The method of claim 21, wherein the transmitting comprises:
sending a plurality of messages from the client to the server; and
receiving, in response to each message, a response from the server to the client,
wherein at least one message sent from the client to the server includes information derived from a previously received response from the server.

27. The method of claim 21, further comprising collecting an answer to a challenge question if the subset of characters of primary credentials, the fingerprint information does not match a reference value, or an anomaly occurs.

28. The method of claim 21, further comprising:
collecting an answer to a challenge question if a processing ability of the client device is below a threshold,
wherein the processing ability relates to the client-related hardware information, client-related software information, client-related network information, or device information of other users of devices similar to the client device.

29. The method of claim 21, wherein the encrypting comprises determining a strength of encrypting based on a processing ability of the client device.

30. The method of claim 21, further comprising downloading, from the server to the client device, a compiled executable software application for collecting the information.

31. The method of claim 30, wherein the software application is selected from a pool of candidate software applications.

32. The method of claim 30, wherein:
the server periodically or randomly varies the software application that is downloaded to the client device; and
a one-way hashed key is obtained from a byte count of the software application.

33. The method of claim 30, further comprising:
detecting a data transmission latency by the client; and
if the detected data transmission latency is different from an expected data transmission latency, shutting off communication between the client and the server.

* * * * *